United States Patent
Obayashi et al.

(10) Patent No.: US 9,841,524 B2
(45) Date of Patent: Dec. 12, 2017

(54) METAL OBJECT DETECTION DEVICE

(71) Applicant: DENSO CORPORATION, Kariya, Aichi-pref. (JP)

(72) Inventors: Kazuyoshi Obayashi, Chita-gun (JP); Akira Kamiya, Toyokawa (JP); Eisuke Takahashi, Kariya (JP); Keisuke Tani, Anjo (JP)

(73) Assignee: DENSO CORPORATION, Kariya (JP)

( * ) Notice: Subject to any disclaimer, the term of this patent is extended or adjusted under 35 U.S.C. 154(b) by 180 days.

(21) Appl. No.: 14/758,078

(22) PCT Filed: Dec. 12, 2013

(86) PCT No.: PCT/JP2013/007316
§ 371 (c)(1),
(2) Date: Jun. 26, 2015

(87) PCT Pub. No.: WO2014/103222
PCT Pub. Date: Jul. 3, 2014

(65) Prior Publication Data
US 2015/0362614 A1    Dec. 17, 2015

(30) Foreign Application Priority Data
Dec. 27, 2012  (JP) .................................. 2012-284970
Dec. 27, 2012  (JP) .................................. 2012-284971

(51) Int. Cl.
*G01V 3/10* (2006.01)
*H02J 17/00* (2006.01)
(Continued)

(52) U.S. Cl.
CPC .............. *G01V 3/104* (2013.01); *H02J 5/005* (2013.01); *H02J 17/00* (2013.01); *H02J 50/10* (2016.02); *H02J 50/80* (2016.02)

(58) Field of Classification Search
CPC ........ G01D 5/2046; G01D 5/20; G01B 7/003; G01B 7/14; G01B 7/30
(Continued)

(56) References Cited

U.S. PATENT DOCUMENTS 3,176,241 A * 3/1965 Hogan ................... H03K 17/97
323/347
3,914,562 A * 10/1975 Bolger ..................... B60K 1/04
191/10
(Continued)

FOREIGN PATENT DOCUMENTS

| JP | 2001-128391 | 5/2001 |
| JP | 2001-275280 | 10/2001 |

(Continued)

OTHER PUBLICATIONS

International Search Report for PCT/JP2013/007316 dated Feb. 10, 2014, five pages.
(Continued)

*Primary Examiner* — Patrick Assouad
*Assistant Examiner* — Christopher McAndrew
(74) *Attorney, Agent, or Firm* — Nixon & Vanderhye P.C.

(57) ABSTRACT

A metal object detection device includes a plurality of detection coils, a capacitor configuring a resonant circuit in cooperation with each of at least two of the detection coils, a first series connection body, a second series connection body, a voltage applying unit, and a processing unit. The voltage applying unit applies an AC voltage to both ends of each of the first series connection body and the second series connection body. The processing unit performs a process for detecting the metal object on the basis of a potential difference between a connection point included in the first series connection body and a connection point included in the second series connection body.

28 Claims, 37 Drawing Sheets

(51) Int. Cl.
*H02J 5/00* (2016.01)
*H02J 50/10* (2016.01)
*H02J 50/80* (2016.01)

(58) Field of Classification Search
USPC .................................................. 324/207.17
See application file for complete search history.

(56) References Cited

U.S. PATENT DOCUMENTS

| | | | | |
|---|---|---|---|---|
| 5,027,709 A | * | 7/1991 | Slagle | F42B 8/28 102/293 |
| 5,432,444 A | | 7/1995 | Yasohama et al. | |
| 7,956,603 B2 | * | 6/2011 | Cochran | A61B 5/1126 324/207.17 |
| 9,219,379 B2 | * | 12/2015 | Uramoto | H02J 7/025 |
| 9,252,846 B2 | * | 2/2016 | Lee | H04B 5/0031 |
| 2008/0116886 A1 | | 5/2008 | Yamada et al. | |
| 2008/0297158 A1 | * | 12/2008 | Heger | G01V 3/107 324/326 |
| 2011/0074346 A1 | | 3/2011 | Hall et al. | |
| 2011/0270462 A1 | | 11/2011 | Amano et al. | |
| 2012/0038317 A1 | * | 2/2012 | Miyamoto | H02J 7/025 320/108 |
| 2012/0091993 A1 | * | 4/2012 | Uramoto | H02J 7/025 324/105 |
| 2012/0119576 A1 | * | 5/2012 | Kesler | B60L 11/182 307/10.1 |
| 2013/0099592 A1 | | 4/2013 | Abe | |
| 2013/0169062 A1 | | 7/2013 | Maikawa et al. | |

FOREIGN PATENT DOCUMENTS

| | | |
|---|---|---|
| JP | 2006-345588 | 12/2006 |
| JP | 2007-170885 | 7/2007 |
| JP | 4421532 | 12/2009 |
| JP | 2010-78401 | 4/2010 |
| JP | 2010-156643 | 7/2010 |
| JP | 2012-244778 | 12/2012 |

OTHER PUBLICATIONS

Written Opinion of the ISA for PCT/JP2013/007316 dated Feb. 10, 2014, seven pages.

Kato et al., "Study of Relation of Efficiency between Receiving Antenna Position and Efficiency for Wireless Power Transfer for Moving Vehicle with Relay Antenna", *IEE-Japan Industry Applications Society Conference*, 2012, four pages.

Japanese Office Action (2 pages) dated Jun. 16, 2015, issued in corresponding Japanese Application No. 2012-284970 and English translation (2 pages).

* cited by examiner

METAL OBJECT
IS NOT PRESENT

METAL OBJECT
IS PRESENT

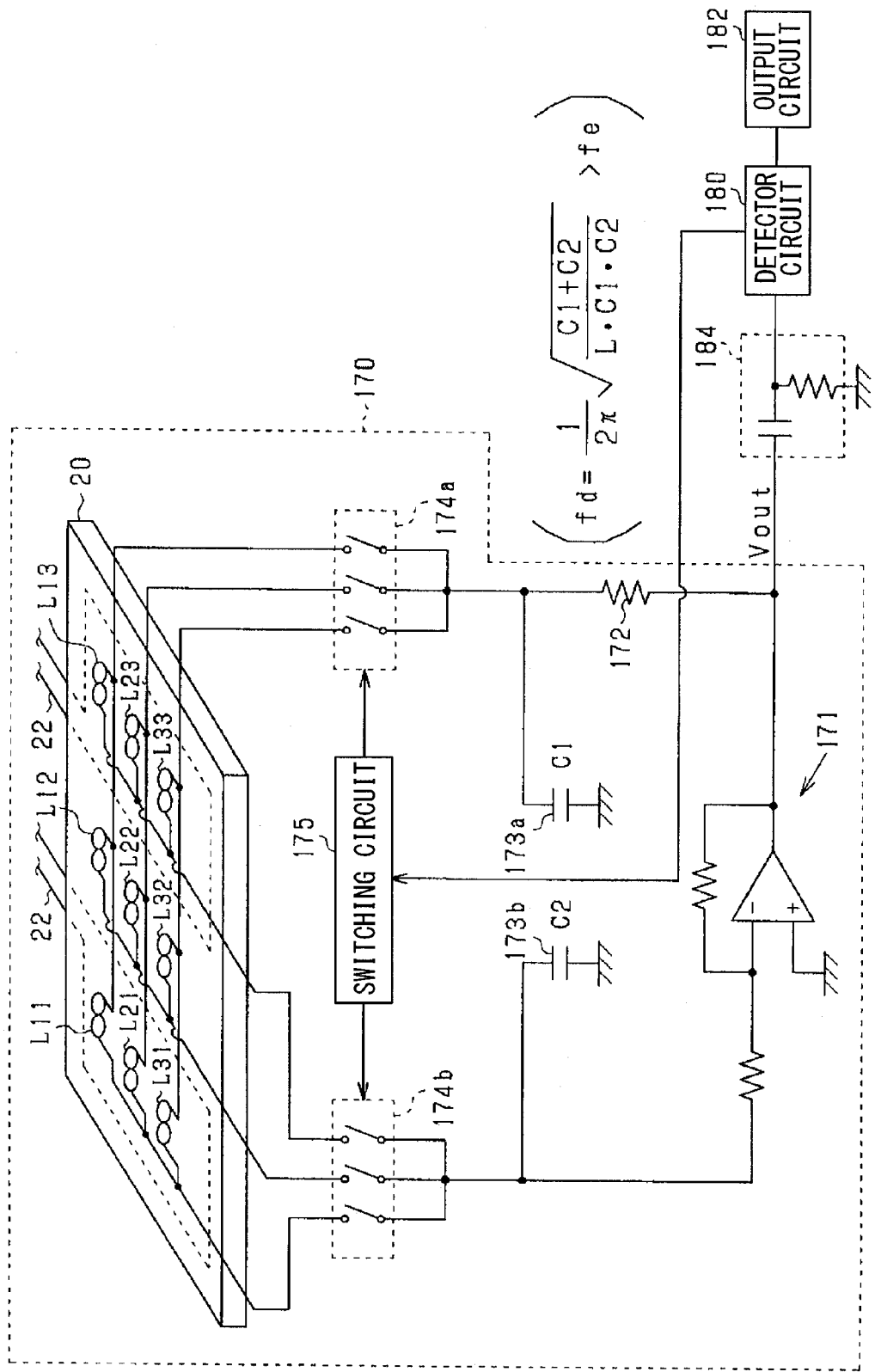

METAL OBJECT DETECTION DEVICE

CROSS REFERENCE TO RELATED APPLICATION

This application is the U.S. national phase of International Application No. PCT/JP2013/007316 filed 12 Dec. 2013 which designated the U.S. and claims priority to Japanese Patent Application No. 2012-284971 filed on Dec. 27, 2012 and Japanese Patent Application No. 2012-284970 filed on Dec. 27, 2012, the entire contents of each of which are hereby incorporated by reference.

TECHNICAL FIELD

The present disclosure relates to a metal object detection device applied to a non-contact power feeding device.

BACKGROUND ART

Conventionally, as disclosed in PTL 1 described below, a metal detector detecting a metal object has been known. Specifically, the metal detector includes a first coil, a second coil magnetically coupled with the first coil and configuring a resonant circuit in cooperation with a capacitor, and a control circuit having a function of detecting the object on the basis of a voltage between both ends of the resonant circuit. The first coil is supplied with an exciting current.

The metal detector configured as described above is slid along a surface of an object embedded with the metal object. When the metal object comes close to the first coil that makes up the metal detector by sliding the metal detector, an eddy current loss is caused by an electromagnetic induction to change an inductance of the first coil. When the inductance of the first coil changes, because an amplitude of a voltage between terminals of the resonant circuit is reduced, the metal object can be detected on the basis of the voltage between the terminals.

In the technique disclosed in the above PTL 1, the metal detector is required to be slid for the purpose of detecting the metal object. Thus, when a region in which the metal object is assumed to be present is large, there is a concern that the metal object cannot be appropriately detected such that man-hours for detecting the metal object increases.

As the metal object detection device applied to a non-contact power feeding device that performs power transfer between the primary coil and the secondary coil in a non-contact manner, as disclosed in the following PTL 2, a device having plural temperature sensors on the primary coil has been known. When the metal object is present on the primary coil at the time of non-contact power feeding, the device detects the metal object by detecting a rise in temperature of the metal object through a temperature sensor. The rise in temperature is caused when the eddy current flows in the metal object. According to the metal object detection device, when the metal object is detected, the power supply of the non-contact power feeding can be lowered, or the power supply can stop. As a result, a rise in the temperature of the metal object present on the primary coil can be suppressed, and further the safety of the non-contact power feeding device can be enhanced.

However, in the metal object detection device disclosed in the above PTL 1, there is a concern about disadvantages described below. In detail, the temperature of the metal object detected by the temperature sensor becomes lower than a real temperature of the metal object due to the presence of the metal object on the primary coil, or an air layer between the respective temperature sensors. This leads to a concern that a detection precision of the metal object is lowered. If the metal object is large, a time until the metal object becomes high in temperature since the non-contact power feeding starts is shortened. Thus, there is a concern that the metal object cannot be detected since the temperature of the metal object starts to rise due to the non-contact power feeding until the temperature of the metal object arrives at the temperature to be detected. Further, there is a concern that the metal object cannot be detected only during the operation of the non-contact power feeding device.

PRIOR ART LITERATURES

Patent Literature

PTL 1: JP 4421532 B
PTL 2: US 2011/0074346 A1

SUMMARY OF INVENTION

An object of the present disclosure is to provide a metal object detection device that is capable of appropriately detecting the metal object.

A metal object detection device according to one aspect of the present disclosure is applied to a non-contact power feeding device that performs power transfer between a primary coil and a secondary coil in a non-contact manner. The metal object detection device includes a plurality of detection coils, a capacitor, a first series connection body, a second series connection body, a voltage applying unit, and a processing unit. The plurality of detection coils detects the metal object present in a path of a magnetic flux generated by at least one of the primary coil and the secondary coil. The capacitor configures a resonant circuit in each of at least two of the plural detection coils.

The first series connection body includes one of a series connection body having at least one of the resonant circuits and a first passive element, and a series connection body having the detection coil and the capacitor configuring one of the resonant circuits. The second series connection body includes one of a series connection body having at least one of the resonant circuits except for the resonant circuit configuring the first series connection body and a second passive element, and a series connection body having the detection coil and the capacitor configuring one of the resonant circuits except for the resonant circuit configuring the first series connection body.

The voltage applying unit applies an AC voltage to both ends of each of the first series connection body and the second series connection body. The processing unit performs a process for detecting the metal object on the basis of a potential difference between a connection point included in the first series connection body and a connection point included in the second series connection body.

The metal object detection device is capable of spreading a detection region of the metal object while enhancing a detection precision of the metal object.

A metal object detection device according to another aspect of the present disclosure is applied to a non-contact power feeding device that performs power transfer between a primary coil and a secondary coil in a non-contact manner. The metal object detection device includes a detection coil, a supply unit, and a processing unit. The detection coil detects the metal object present in a path of a magnetic flux generated by at least one of the primary coil and the secondary coil when the power transfer is performed in the non-contact manner. The supply unit supplies an AC power to the detection coil. The processing unit performs a process for detecting the metal object on the basis of a change in impedance of the detection coil when the AC power is supplied by the supply unit. The detection coil includes a portion in which an induced current flows in a predetermined direction, and a portion in which the induced current flows in a direction opposite to the predetermined direction when a main magnetic flux circulating between the primary coil and the secondary coil passes through the detection coil.

Even if the detection of the temperature rise of the metal object by the temperature sensor is insufficient, or the non-contact power feeding device does not operate, the metal object detection device can detect the metal object. The metal object detection device is capable of suppressing an influence of the main magnetic flux on the detection of the metal object and the non-contact power transfer.

BRIEF DESCRIPTION OF DRAWINGS

The above and other objects, features and advantages of the present disclosure will become more apparent from the following detailed description made with reference to the accompanying drawings. In the drawings:

FIG. 32 is a circuit diagram of a metal object detection device according to a thirteenth embodiment;

DESCRIPTION OF EMBODIMENTS

First Embodiment

Hereinafter, a description will be given of a first embodiment in which a metal object detection device according to the present disclosure is applied to a non-contact power feeding system for a vehicle (hybrid vehicle or electric vehicle) having a rotary machine as an in-vehicle main equipment with reference to the drawings.

Figure 1:
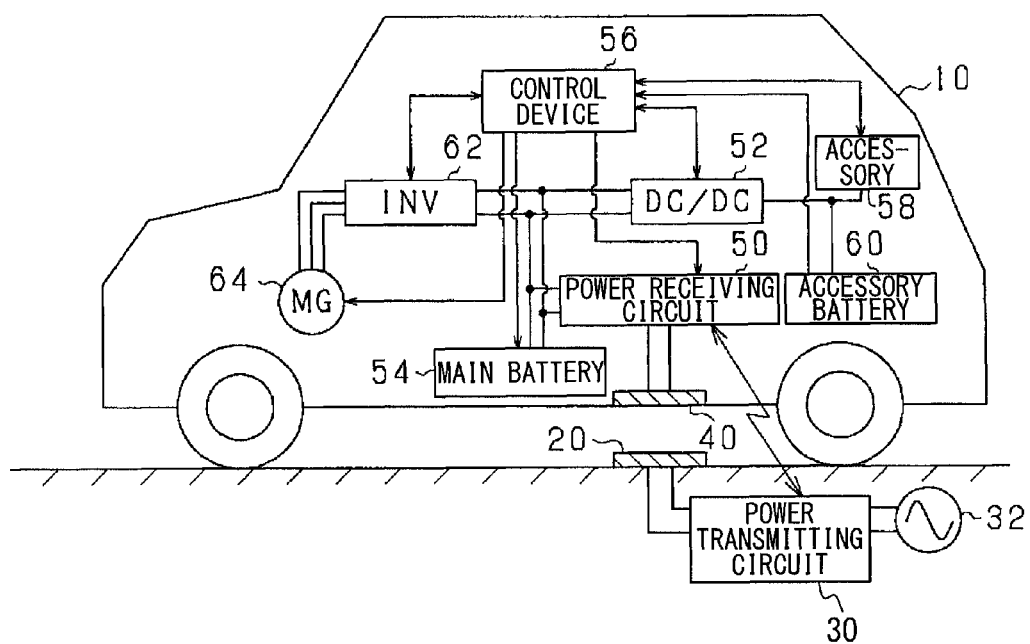
FIG. 1 is a configuration diagram of a non-contact power feeding system according to a first embodiment.

As illustrated in FIG. 1, a non-contact power feeding system includes a power transmitting system disposed outside of a vehicle 10, and a power receiving system installed in the vehicle 10.

The power transmitting system includes a power transmitting pad 20 as a power transmitting member, and a power transmitting circuit 30. In detail, the power transmitting circuit 30 includes a power converter circuit (for example, a full bridge circuit) that converts a frequency of an AC external power supply 32 (system power supply) installed outside of the vehicle 10 into a predetermined high frequency (several kHz to tens of MHz, for example, 20 kHz), and a resonant circuit that supplies an electric power output from the power converter circuit into the power transmitting pad 20.

The power transmitting pad 20 is a member including a primary core and a primary coil wound on the primary core, for transmitting the electric power to a power receiving pad 40 provided in the power receiving system by an electromagnetic induction.

On the other hand, the power receiving system includes the power receiving pad 40 as a power receiving member, a power receiving circuit 50, a DCDC converter 52, a main battery 54 as a power storage unit, and a control device 56. In detail, the power receiving pad 40 is a member including a secondary core and a secondary coil wound on the secondary core, for receiving an electric power transmitted from the power transmitting pad 20. The power receiving pad 40 is arranged on a lower portion (outside of a floor) of the vehicle 10.

The electric power received by the power receiving pad 40 is supplied to the power receiving circuit 50. The power receiving circuit 50 includes a resonant circuit that receives the electric power received by the power receiving pad 40, a rectifier circuit that converts an AC current having a high frequency output from the resonant circuit into a DC current, and a power converter circuit that converts an output voltage of the rectifier circuit into a predetermined voltage, and applies the converted voltage to the main battery 54. The output voltages from the power receiving circuit 50 and the main battery 54 are stepped down by the DCDC converter 52, and applied to vehicle accessories 58 and an accessory battery 60.

The main battery 54 is a battery having a terminal voltage of, for example, one hundred V or higher, specifically such as a nickel-hydrogen secondary battery or a lithium-ion secondary battery. Also, the accessory battery 60 is a battery having a terminal voltage sufficiently lower than the terminal voltage of the main battery 54, specifically such as a lead-acid storage battery. Further, the vehicle 10 is equipped with an inverter 62 that converts a DC power of the main battery 54 into an AC power, and outputs the AC power, and a motor generator 64 rotationally driven by the AC power output from the inverter 62 as an in-vehicle main equipment, in addition to the power receiving system.

The control device 56 operates the inverter 62 for controlling the driving of the motor generator 64, and operates the DCDC converter 52 for supplying the electric power to the vehicle accessories 58 and the accessory battery 60. The control device 56 instructs the power receiving circuit 50 to execute a charging process for feeding the power to the vehicle. With this operation, the power receiving circuit 50 operates to charge the vehicle 10 while transferring information between the power receiving circuit 50 and the power transmitting circuit 30 through respective radio communication interfaces installed in the power receiving circuit 50 and the power transmitting circuit 30.

Figure 2:
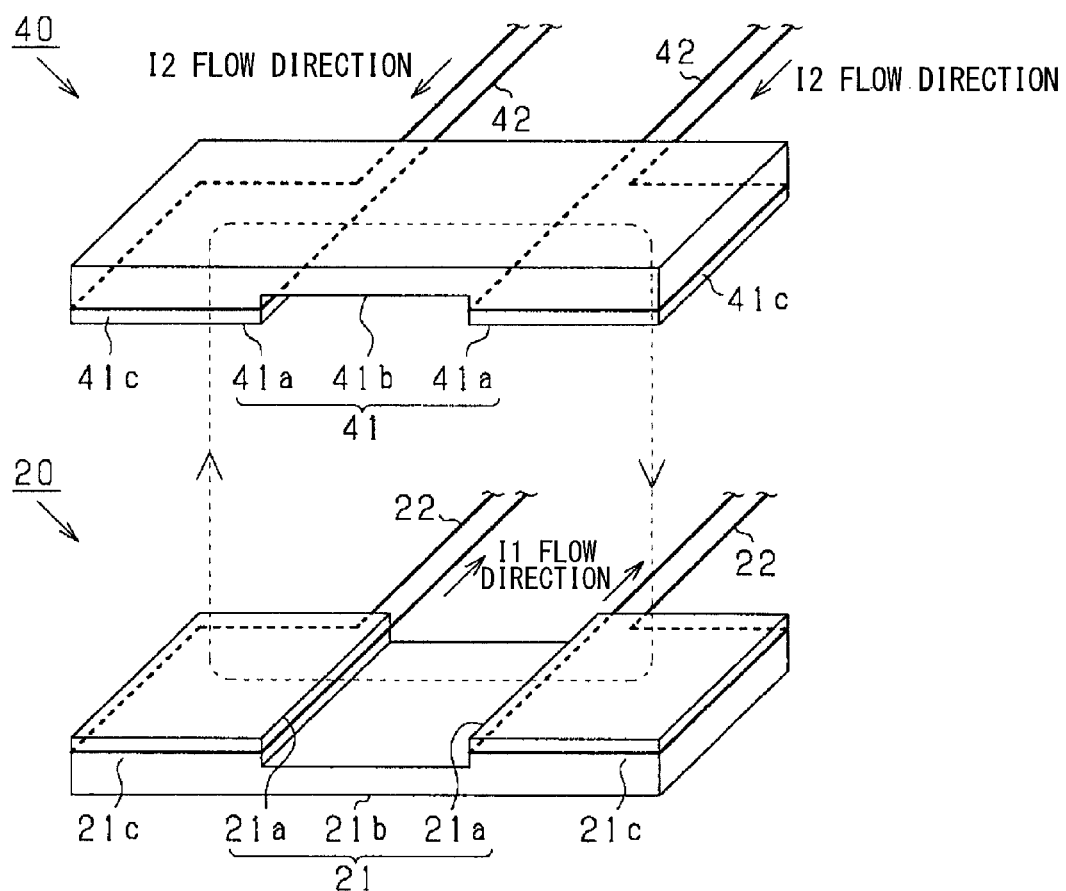
FIG. 2 is a perspective view of a power transmitting pad and a power receiving pad according to the first embodiment.

Subsequently, the power transmitting pad 20 and the power receiving pad 40 according to the present embodiment will be described in detail with reference to FIG. 2. FIG. 2 is a perspective view of components of the power transmitting pad 20 and the power receiving pad 40.

As shown in the figure, the power transmitting pad 20 includes a primary core 21 and a primary coil 22 wound on the primary core 21, and is formed in a flat shape. In detail, the primary core 21 is a member in which a pair of primary spacing parts 21a is formed integrally with a primary coupling part 21b. The pair of primary spacing parts 21a is shaped into a rectangular plate and spaced from each other, and the primary coupling part 21b is shaped into a rectangular plate that couples the respective primary spacing parts 21a with each other. Each of the pair of primary spacing parts 21a has plate surfaces (plane), and a peripheral edge portion 21c. The primary coupling part 21b is coupled to one of the paired plate surfaces of each of the primary spacing parts 21a on the opposite side of the power receiving pad 40 side. The primary coil 22 is wound on each peripheral edge portion 21c of those primary spacing parts 21a in plural rounds. In the present embodiment, ferrite is used as the primary core 21.

On the other hand, the power receiving pad 40 includes a secondary core 41 and a secondary coil 42 wound on the secondary core 41, and is formed in a flat shape. In detail, the secondary core 41 is a member in which a pair of secondary spacing parts 41a is formed integrally with a secondary coupling part 41b. The pair of secondary spacing parts 41a is shaped into a rectangular plate and spaced from each other, and the secondary coupling part 41b is shaped into a rectangular plate that couples the respective secondary spacing parts 41a with each other. Each of the pair of secondary spacing parts 41a has plate surfaces (plane), and a peripheral edge portion 41c. The secondary coupling part 41b is coupled to one of the paired plate surfaces of each of the secondary spacing parts 41a on the opposite side of the power transmitting pad 20 side. The secondary coil 42 is wound on each peripheral edge portion 41c of those secondary spacing parts 41a in plural rounds. In the present embodiment, ferrite is used as the secondary core 41 as with the primary core 21.

When non-contact power feeding is performed, the primary core 21 and the secondary core 41 are arranged in such a manner that the plate surfaces of the primary spacing parts 21a and the plate surfaces of the secondary spacing parts 41a face each other, and become in parallel to each other.

In FIG. 2, an example of a flow direction of a current I1 flowing in the primary coil 22 and a flow direction of a current I2 flowing in the secondary coil 42 is indicated by arrows. When a high frequency current flows in the primary coil 22, a magnetic field is generated inside of the primary coil 22. As a result, as indicated by dashed arrows in the figure, a magnetic flux flows from one plate surface side of the paired primary spacing parts 21a into the opposed plate surface side of the secondary spacing parts 41a, and an induced current flows into the secondary coil 42. Thus, a magnetic field is generated inside of the secondary coil 42, and a magnetic flux flows from the other plate surface side of the paired secondary spacing parts 41a into the opposed plate surface side of the primary spacing parts 21a. As a result, a main magnetic flux circulating between the primary core 21 and the secondary coil 41 is formed. As a result, an electric power is transferred between the primary coil 22 and the secondary coil 42 in a non-contact manner.

Subsequently, a description will be given of the metal object detection device according to the present embodiment provided in the power transmitting system with reference to FIGS. 3 to 6.

The metal object detection device includes first to fourth detection coils 70a to 70d, first to fourth capacitors 71a to 71d, an AC power supply 72, a filter circuit 73, and a determination unit 74. In detail, the first detection coil 70a and the first capacitor 71a configure a first resonant circuit Res1 that is a series resonant circuit, and the second detection coil 70b and the second capacitor 71b configure a second resonant circuit Res2 that is the series resonant circuit. The third detection coil 70c and the third capacitor 71c configure a third resonant circuit Res3 that is a series resonant circuit, and the fourth detection coil 70d and the fourth capacitor 71d configure a fourth resonant circuit Res4 that is the series resonant circuit. The first resonant circuit Res1 and the second resonant circuit Res2 are connected in series with each other, and the third resonant circuit Res3 and the fourth resonant circuit Res4 are connected in series with each other.

In the present embodiment, a series connection body of the first resonant circuit Res1 and the second resonant circuit Res2 corresponds to "first series connection body", and a series connection body of the third resonant circuit Res3 and the fourth resonant circuit Res4 corresponds to "second series connection body". The second resonant circuit Res2 corresponds to "first passive element" connected in series with the first resonant circuit Res1, and the fourth resonant circuit Res4 corresponds to "second passive element" connected in series with the third resonant circuit Res3.

The series connection body of the first resonant circuit Res1 and the second resonant circuit Res2 is connected in parallel to the series connection body of the third resonant circuit Res3 and the fourth resonant circuit Res4. In other words, an AC bridge (Wheatstone bridge) is formed by the first to fourth resonant circuits Res1 to Res4.

Figure 4:
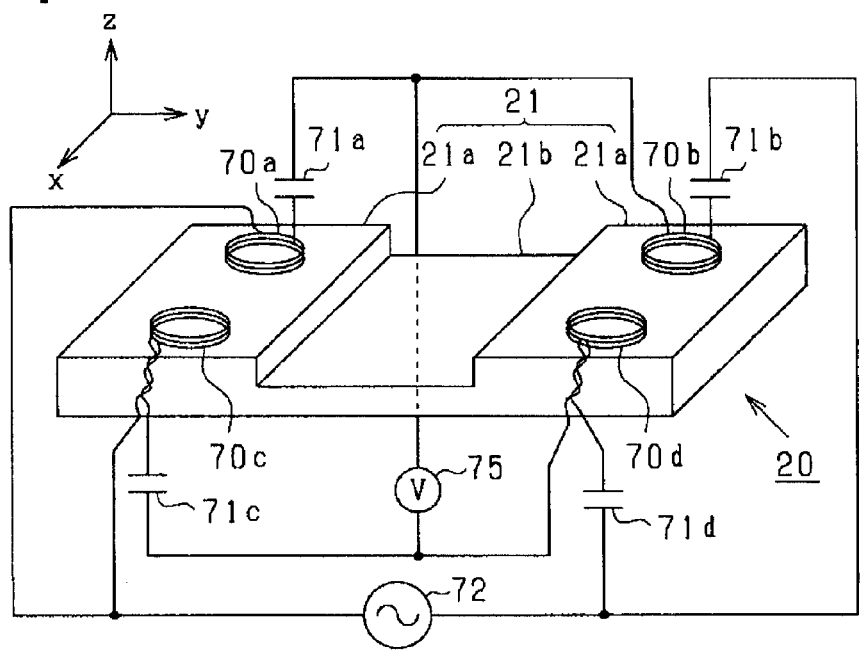
FIG. 4 is a diagram illustrating the arrangement of detection coils in the power transmitting pad according to the first embodiment.

FIG. 4 illustrates an arrangement mode of the first to fourth detection coils 70a to 70d. In FIG. 4, the illustration of the primary coil 22 is omitted.

As shown in the figure, the first to fourth detection coils 70a to 70d are coils for detecting a metal object as a foreign matter present on the power transmitting pad 20, and in the present embodiment, circular coils of a flat shape are assumed. The first to fourth detection coils 70a to 70d are so arranged as to detect the metal object present on a path of a magnetic flux generated by at least one of the primary coil 22 and the secondary coil 42. Specifically, those coils 70a to 70d are arranged so that radial directions of the coils 70a to 70d are in parallel to the plate surface (plate surface of the primary spacing parts 21a) of the power transmitting pad 20. In FIG. 4, a pair of axes configuring a plane parallel to the plate surface of the primary spacing parts 21a, and orthogonal to each other is indicated by an x-axis and a y-axis.

In the present embodiment, it is assumed that the power transmitting pad 20 is really configured so that the first to fourth detection coils 70a to 70d are arranged above the primary coil 22, and the primary core 21, the primary coil 22, and the first to fourth detection coils 70a to 70d are molded with resin. That is, the first to fourth detection coils 70a to 70d are embedded in the power transmitting pad 20. As with the power transmitting pad 20, it is assumed that the power receiving pad 40 is configured so that the secondary core 41 and the secondary coil 42 are molded with resin.

Figure 3:
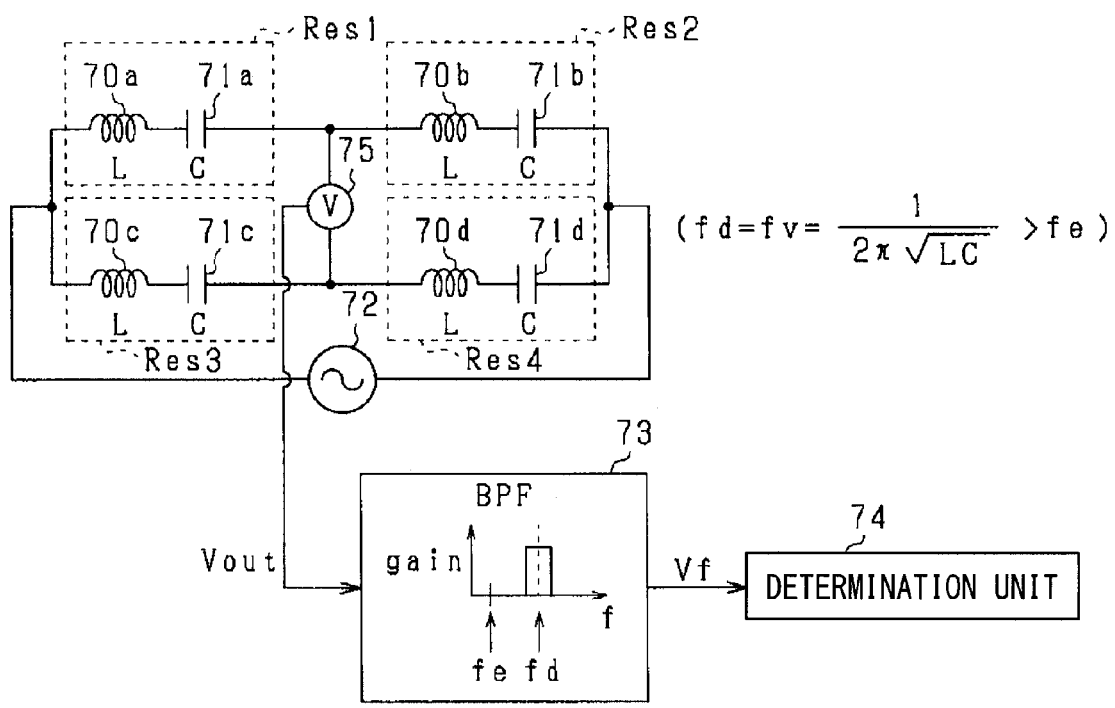
FIG. 3 is a circuit diagram of a metal object detection device according to the first embodiment.
Figure 5:
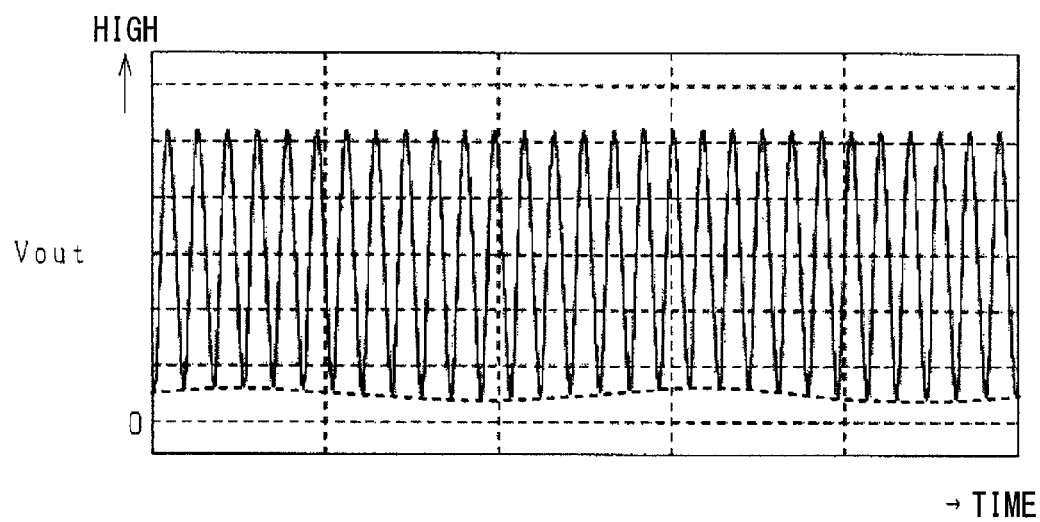
FIG. 5 is a graph illustrating the transition of a detection value of a voltage sensor according to the first embodiment.

As illustrated in FIG. 3, the AC bridge is equipped with a voltage sensor 75. The voltage sensor 75 detects a potential difference between a connection point of the first resonant circuit Res1 and the second resonant circuit Res2, and a connection point of the third resonant circuit Res3 and the fourth resonant circuit Res4. A detection value (hereinafter referred to as "output voltage Vout") of the voltage sensor 75 is input to the filter circuit 73. In the present embodiment, the filter circuit 73 is a band-pass filter, and disposed to avoid a reduction in detection precision of the metal object which is caused by a metal object detecting process which will be described later. That is, as illustrated in FIG. 5, as indicated by dashed lines, a component of a use frequency fe of the non-contact power feeding (frequency of a voltage applied to the primary coil 22, for example, 20 kHz) may be superimposed on the output voltage Vout. In this case, since a waveform of the output voltage Vout is distorted, there is a concern about a reduction in the detection precision of the metal object caused by the metal object detecting process. In order to avoid the above problem, the filter circuit 73 is provided.

The output value Vf of the filter circuit 73 is input to the determination unit 74 as a software processing unit. The determination unit 74 performs the metal object detecting process for detecting the metal object on the power transmitting pad 20 on the basis of the output value Vf. Hereinafter, the above processing will be described in association with setting of a resonant frequency fd of the first to fourth resonant circuits Res1 to Res4, and a frequency fv of the output voltage of the AC power supply 72.

First, the setting of the resonant frequency fd will be described. In the present embodiment, the resonant frequencies fd of the first to fourth resonant circuits Res1 to Res4 are set to the same frequency. In other words, the first to fourth detection coils 70a to 70d configuring the first to fourth resonant circuits Res1 to Res4 have the same specification, and the first to fourth capacitors 71a to 71d configuring the first to fourth resonant circuits Res1 to Res4 have the same specification. Thus, in FIG. 3, an inductance of the first to fourth detection coils 70a to 70d is indicated by "L", and a capacitance of the first to fourth capacitors 71a to 71d is indicated by "C". As a result, the resonant frequencies fd of the first to fourth resonant circuits Res1 to Res 4 are represented by the following equation (eq1).

[Equation 1]

$$f_d = \frac{1}{2\pi\sqrt{L \cdot C}} \quad \text{(eq 1)}$$

In the present embodiment, the frequency fv of the output voltage of the AC power supply 72 is set to the same frequency as the above resonant frequency fd under a situation where no metal object is present on the power transmitting pad 20. Thus, when no metal object is present on the power transmitting pad 20, since a potential of a connection point between the first resonant circuit Res1 and the second resonant circuit Res2 becomes equal to a potential of a connection point between the third resonant circuit Res3 and the fourth resonant circuit Res4, the output voltage Vout becomes "0". On the contrary, when the metal object is present on the power transmitting pad 20, and the metal object comes close to any one of the first to fourth detection coils 70a to 70d, an eddy current loss is caused by electromagnetic induction. Thus, a resonance level of the resonant circuit having the detection coil to which the metal object comes close as a component changes due to a change in impedance of the detection coil to which the metal object comes close, and the output voltage Vout largely changes from a reference value "0". In view of this phenomenon, the metal object on the power transmitting pad 20 can be detected on the basis of the output voltage Vout.

A configuration having the first to fourth detection coils 70a to 70d as a component of the resonant circuit to detect the metal object on the basis of the potential difference between the respective connection points of the resonant circuit is employed for the purpose of enhancing the detection precision of the metal object. That is, as the metal object on the power transmitting pad 20 is smaller, a change in the inductance of the detection coils becomes smaller. According to the resonant circuit, even when a change in the inductance of the detection coils is small, because this change is amplified to enable the higher sensitivity, the detection precision of the metal object can be enhanced.

Further, the resonant frequency fd is set to a frequency (for example, 200 kHz) higher than the use frequency fe of the non-contact power feeding, and more particularly, set to a frequency twice or more as large as the use frequency fe. This setting is intended to avoid a reduction in reliability of the metal object detection device. That is, when the main magnetic flux circulating between the primary coil 22 and the secondary coil 42 passes through the detection coils, a current flows into the detection coils. When the resonant frequency fd is sufficiently separated from the use frequency fe, since the impedance of the resonant circuit at the use frequency fe becomes sufficiently large, even if the main magnetic flux passes through the detection coils, the current can be restrained from flowing into the detection coils. As a result, the reduction in the reliability of the metal object detection device is avoided.

Figure 6:
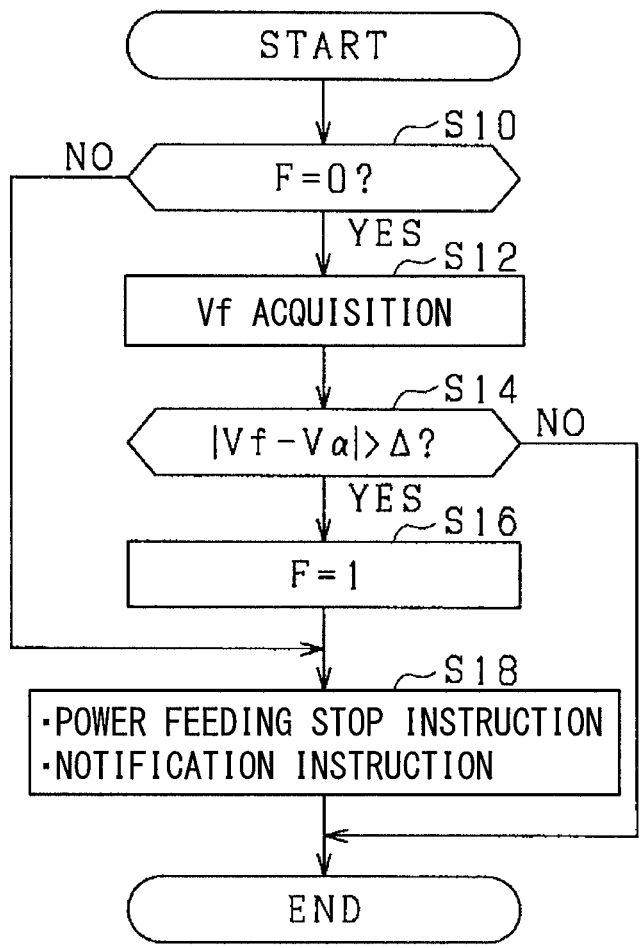
FIG. 6 is a flowchart illustrating a procedure of a metal object detecting process according to the first embodiment.

Subsequently, FIG. 6 illustrates a procedure of the metal object detecting process according to the present embodiment. This process is repetitively executed by the determination unit 74, for example, in a predetermined period.

In the series of processes, it is first determined in S10 whether a value of a detection flag F is "0", or not. The detection flag F of "0" indicates that no metal object is present, and the detection flag F of "1" indicates that the metal object is present on the power transmitting pad 20. An initial value of the detection flag F is set to "0".

If an affirmative determination is made in S10, it is determined that no metal object is present, and the process proceeds to S12. In S12, an output value Vf of the filter circuit 73 is acquired.

Subsequently in S14, it is determined whether an absolute value of the difference between the output value Vf and a specified value Vα exceeds a threshold value Δ, or not. In more detail, it is determined whether a latest maximum value of the absolute value exceeds the threshold value Δ, or not. This process is intended to determine whether the metal object is present on the power transmitting pad 20, or not. That is, as described above, when the metal object is present on the power transmitting pad 20, the output value Vf largely changes from "0". The specified value Vα may be set to, for example, the output value Vf (for example, nearly "0") assumed when no metal object is present on the power transmitting pad 20. The threshold value Δ may be set to, for example, a minute value.

If an affirmative determination is made in S14, it is determined that the metal object is present on the power transmitting pad 20, and the process proceeds to S16. In S16, the value of the detection flag F is set to "1".

When the process in S16 is completed, or when a negative determination is made in S10, the process proceeds to S18. In S18, stop of the power supply to the power receiving pad 40 from the power transmitting pad 20, and notification of a fact that the metal object is present to the user are instructed. As a result, the power supply from the power transmitting pad 20 to the power receiving pad 40 stops, and the user is notified of the fact that the metal object is present by some notification unit.

Incidentally, when it is determined that the metal object is present, the value of the detection flag F is held at "1" until it is then determined that the metal object has been removed from the power transmitting pad 20.

When the negative determination is made in S14, or when the process in S18 is completed, the series of processes is terminated once.

According to the present embodiment described above in detail, the following advantages are obtained.

(i) The metal object detecting process for detecting the metal object on the power transmitting pad 20 on the basis of the potential difference between the connection point of the first resonant circuit Res1 and the second resonant circuit Res2, and the connection point of the third resonant circuit Res3 and the fourth resonant circuit Res4 is performed. Accordingly, the detection precision of the metal object can be enhanced. In particular, in the present embodiment, the respective resonant frequencies fd of the first to fourth resonant circuits Res1 to Res4, and the frequency fv of the output voltage of the AC power supply 72 are set to the same frequency. This contributes to an improvement in the detection precision of the metal object.

Further, according to the present embodiment, since the plural detection coils as the components of the first to fourth resonant circuits Res1 to Res4 are provided, the detection region of the metal object can be spread while the detection precision of the metal object is enhanced.

(ii) The first to fourth resonant circuits Res1 to Res4 are configured so that the impedances at the frequency fv of the output voltage of the AC power supply 72 are identical with each other. In particular, in the present embodiment, the detection coils and the capacitors configuring the respective first to fourth resonant circuits Res1 to Res4 have the same specifications in the respective first to fourth resonant circuits Res1 to Res4. According to this configuration, the components configuring the metal object detection device can be commonalized.

(iii) The AC bridge is formed by the first to fourth resonant circuits Res1 to Res4. Thus, the detection of the metal object by the first to fourth detection coils 70a to 70d can be performed with the detection value of the single voltage sensor 75.

(iv) The resonant frequencies fd of the first to fourth resonant circuits Res1 to Res4 are set to the frequency higher than the use frequency fe. According to this setting, even when the main magnetic flux passes through the detection coils at the time of non-contact power feeding, a current can be restrained from flowing through the detection coils. Accordingly, the reliability of the metal object detection device can be prevented from being lowered.

(v) The filter circuit 73 is provided. Accordingly, an influence of the use frequency fe can be removed from the output voltage Vout, and further a reduction in the detection precision of the metal object can be avoided.

Second Embodiment

Hereinafter, a description will be given of a second embodiment, mainly differences from the first embodiment described above with reference to the drawings.

Figure 7:
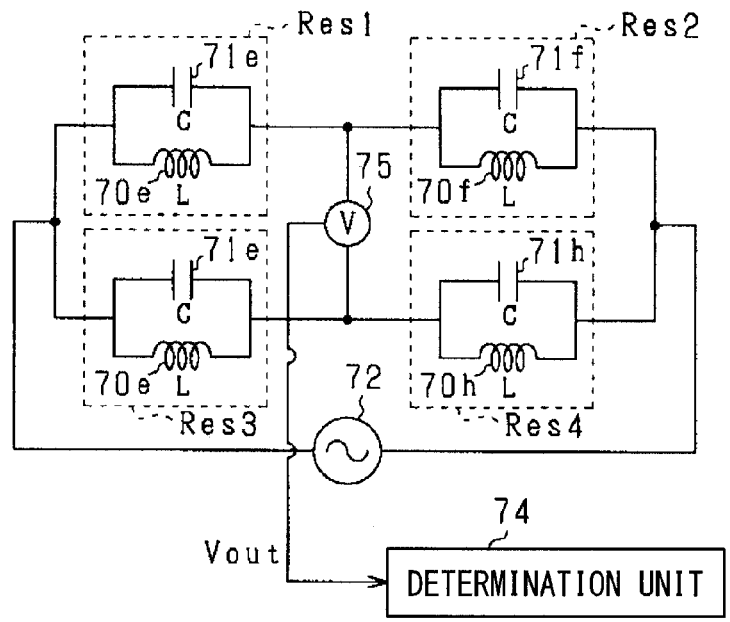
FIG. 7 is a circuit diagram of a metal object detection device according to a second embodiment.

In the present embodiment, a circuit configuration of a metal object detection device is changed. In detail, as illustrated in FIG. 7, the first to fourth resonant circuits Res1 to Res4 are configured by parallel resonant circuits. In FIG. 7, detection coils configuring those resonant circuits Res1 to Res4 are indicated by "70e to 70h", and capacitors configuring those resonant circuits Res1 to Res4 are indicated by "71e to 71h". In FIG. 7, the same members as the members illustrated in FIG. 3 described above are denoted by the same symbols for convenience.

Likewise, in the present embodiment described above, the same advantages as the advantages (i) to (iv) of the first embodiment can be obtained.

Third Embodiment

Hereinafter, a description will be given of a third embodiment, mainly differences from the first embodiment described above with reference to the drawings. In the present embodiment, the shape of the detection coils is changed.

Figure 8:
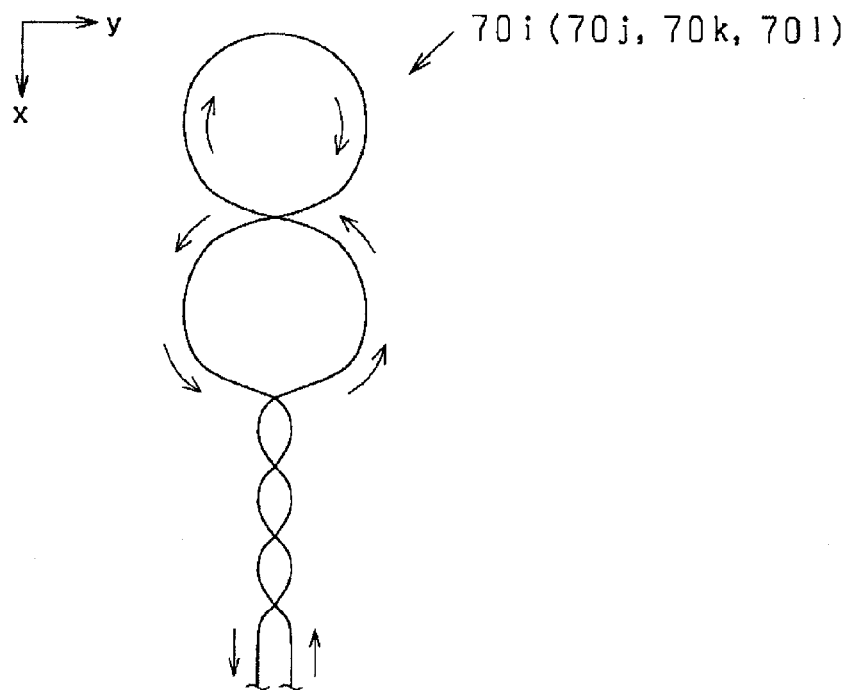
FIG. 8 is a diagram illustrating the shape of detection coils according to a third embodiment.

FIG. 8 illustrates an arrangement mode of the detection coils according to the present embodiment. FIG. 8 is a diagram of the detection coils when viewed from a direction orthogonal to a plane configured by the x-axis and the y-axis illustrated in FIG. 4 described above.

As shown in the figure, in the present embodiment, axisymmetric coils (coils formed on a single plane) are used as first to fourth detection coils 70i to 70l, and specifically, 8-shaped coils are employed.

Figure 9:
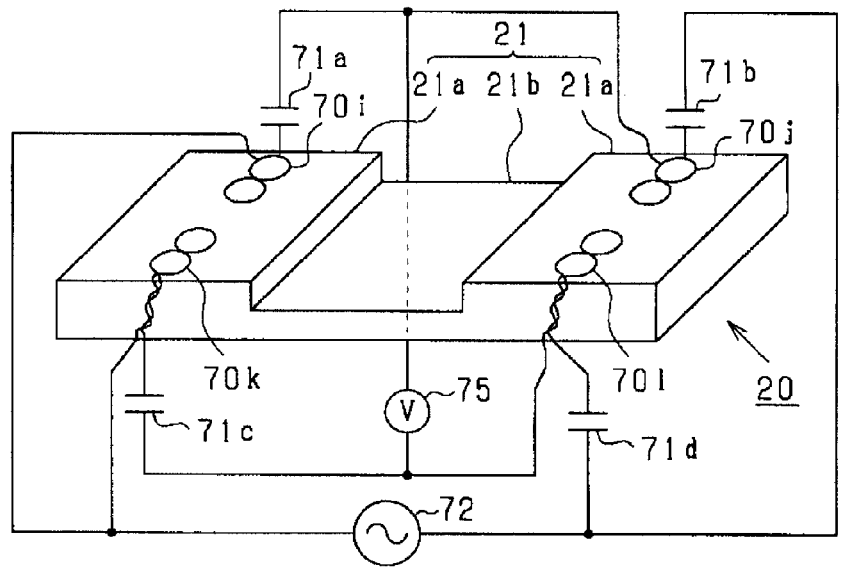
FIG. 9 is a diagram illustrating the arrangement of detection coils in the power transmitting pad according to the third embodiment.

FIG. 9 illustrates an arrangement mode of the first to fourth detection coils 70i to 70l. In FIG. 9, the same members as the members illustrated in FIG. 4 described above are denoted by the same symbols for convenience.

As shown in the figure, the respective first to fourth detection coils 70i to 70l are formed on a plane parallel to plate surfaces of primary spacing parts 21a. Thus, when a main magnetic flux circulating between a primary coil 22 and a secondary coil 42 passes through the first to fourth detection coils 70i to 70l, each of the first to fourth detection coils 70i to 70l has a portion in which an induced current flows in a predetermined direction, and a portion in which the induced current flows in a direction opposite to the predetermined direction. With the above configuration, a current can be restrained from flowing through the first to fourth detection coils 70i to 70l by the main magnetic flux. A situation in which the reliability of the metal object detection device is lowered can be avoided, and a reduction in the power transmission efficiency from the primary coil 22 to the secondary coil 42 can be suppressed.

Fourth Embodiment

Hereinafter, a description will be given of a fourth embodiment, mainly differences from the first embodiment described above with reference to the drawings. In the present embodiment, a circuit configuration of a metal object detection device is changed.

Figure 10:
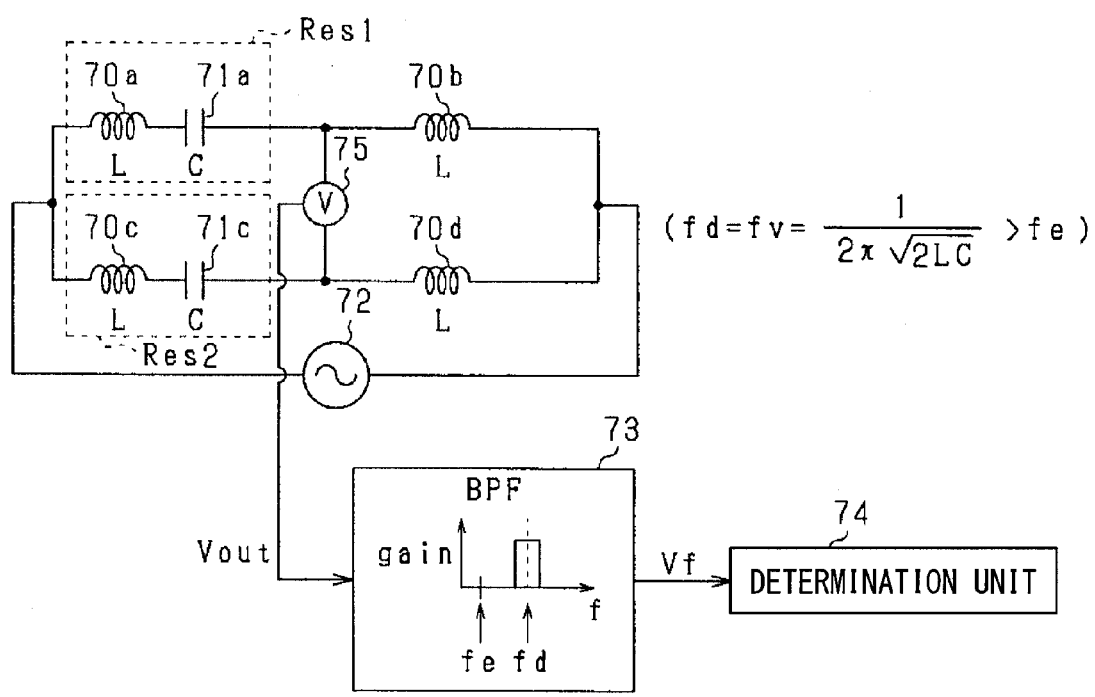
FIG. 10 is a circuit diagram of a metal object detection device according to a fourth embodiment.

FIG. 10 is a circuit diagram of the metal object detection device according to the present embodiment. In FIG. 10, the same members as the members illustrated in FIG. 3 described above are denoted by the same symbols for convenience.

As shown in the figure, in the present embodiment, a second capacitor 71b and a fourth capacitor 71d are removed. In FIG. 10, a resonant circuit described as the third resonant circuit in FIG. 3 described above is denoted by "Res2".

Incidentally, in the present embodiment, a series connection body of the first resonant circuit Res1 and the second detection coil 70b corresponds to "first series connection body", and a series connection body of the second resonant circuit Res2 and the fourth detection coil 70d corresponds to "second series connection body". The second detection coil 70b connected in series with the first resonant circuit Res1 corresponds to "first passive element", and the fourth detection coil 70d connected in series with the second resonant circuit Res2 corresponds to "second passive element". The respective resonant frequencies fd of the series connection body of the first resonant circuit Res1 and the second detection coil 70b, and the series connection body of the second resonant circuit Res2 and the fourth detection coil 70d are represented by the following equation (eq2).

[Equation 2]

$$f_d = \frac{1}{2\pi\sqrt{2L \cdot C}} \qquad (eq\ 2)$$

According to the present embodiment described above, an advantage analogous to the advantage (i) of the above first embodiment, and the same advantages as the advantages (ii) to (v) of the first embodiment can be obtained.

Fifth Embodiment

Hereinafter, a description will be given of a fifth embodiment, mainly differences from the first embodiment described above with reference to the drawings.

In the present embodiment, a circuit configuration of a metal object detection device is changed.

Figure 11:
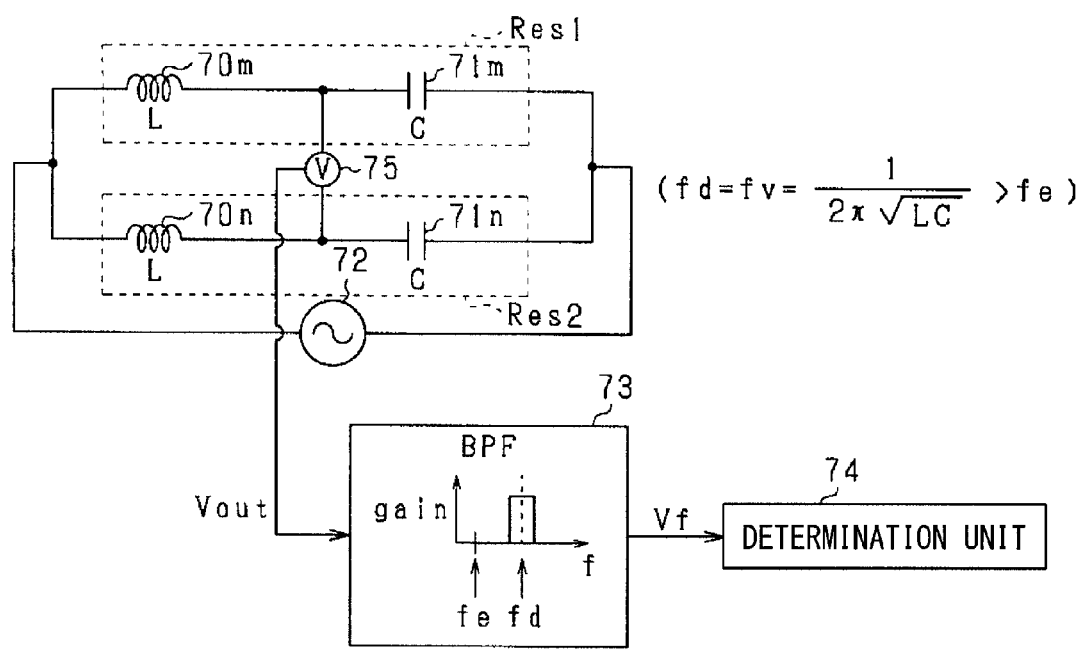
FIG. 11 is a circuit diagram of a metal object detection device according to a fifth embodiment.

FIG. 11 is a circuit diagram of the metal object detection device according to the present embodiment. In FIG. 11, the same members as the members illustrated in FIG. 3 described above are denoted by the same symbols for convenience.

As shown in the figure, in the present embodiment, it is assumed that a series resonant circuit including a first detection coil 70m and a first capacitor 71m is a first resonant circuit Res1, and a series resonant circuit including a second detection coil 70n and a second capacitor 71n is a second resonant circuit Res2. The first resonant circuit Res1 and the second resonant circuit Res2 are connected in parallel to each other. In the present embodiment, the first resonant circuit Res1 corresponds to "first series connection body", and the second resonant circuit Res2 corresponds to "second series connection body".

In the above configuration, a potential difference between a connection point (connection point included in the first resonant circuit Res1) of the first detection coil 70m and the first capacitor 71m, and a connection point (connection point included in the second resonant circuit Res2) of the second detection coil 70n and the second capacitor 71n is detected by a voltage sensor 75.

According to the present embodiment described above, an advantage analogous to the advantage (i) of the above first embodiment, and the same advantages as the advantages (ii) to (v) of the first embodiment can be obtained.

Sixth Embodiment

Hereinafter, a description will be given of a sixth embodiment, mainly differences from the first embodiment described above with reference to the drawings. In the present embodiment, a circuit configuration of a metal object detection device is changed.

Figure 12:
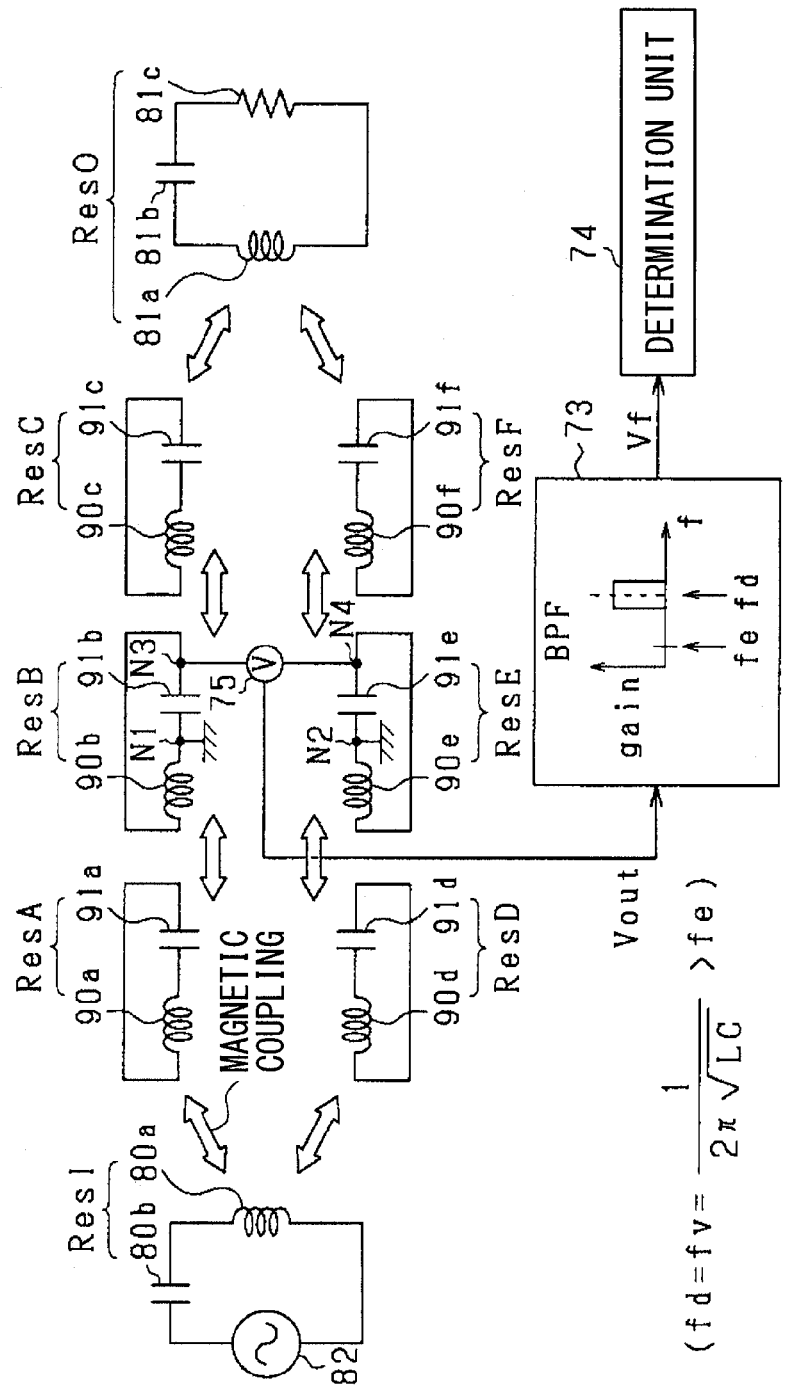
FIG. 12 is a circuit diagram of a metal object detection device according to a sixth embodiment.

FIG. 12 is a circuit diagram of the metal object detection device according to the present embodiment. In FIG. 12, the same members as the members illustrated in FIG. 3 described above are denoted by the same symbols for convenience.

As shown in the figure, the metal object detection device according to the present embodiment includes a series resonant circuit (hereinafter referred to as "input side resonant circuit ResI") including an input side coil 80a and an input side capacitor 80b, and a series resonant circuit (hereinafter referred to as "load side resonant circuit ResO") including a load side coil 81a, a load side capacitor 81b, and a resistor 81c. The input side resonant circuit ResI is applied with an AC voltage by an AC power supply 82.

Figure 13:
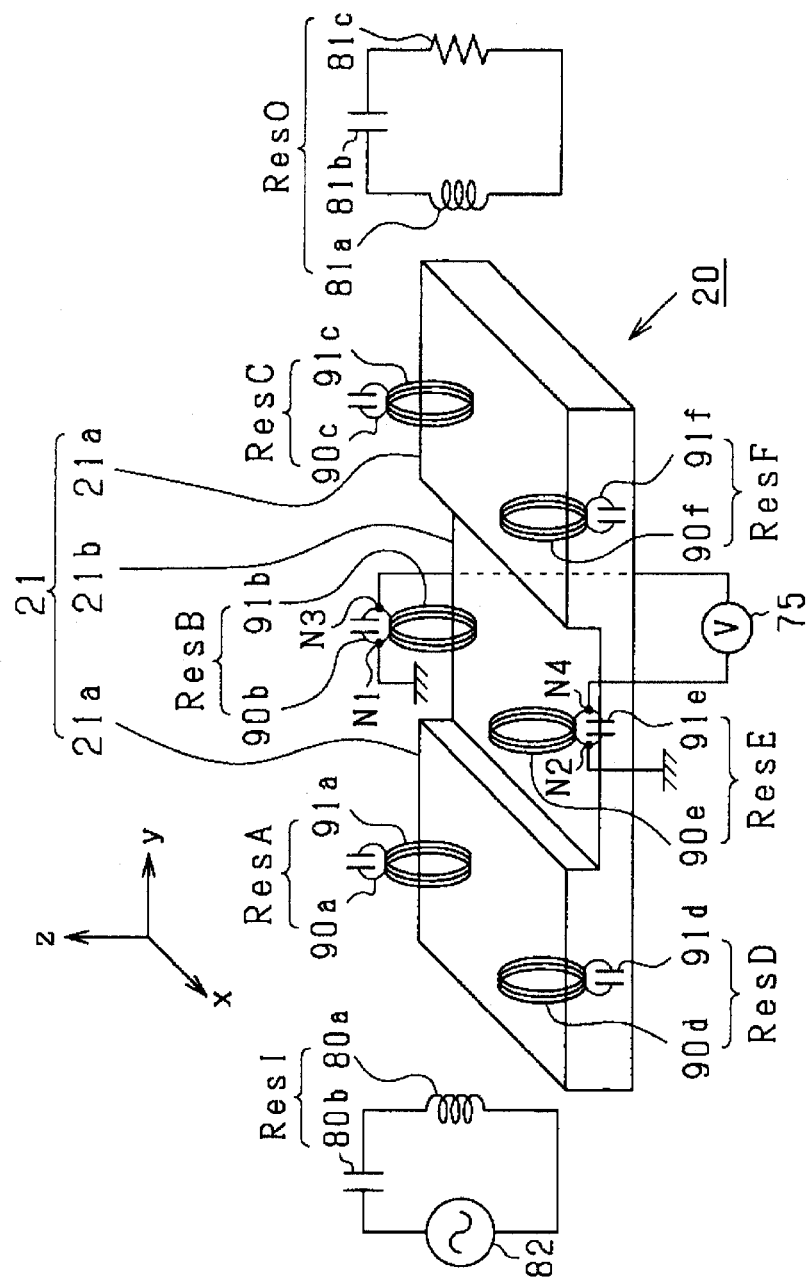
FIG. 13 is a diagram illustrating the arrangement of detection coils in a power transmitting pad according to the sixth embodiment.

First to sixth relay coils 90a to 90f for supplying the electric power from the input side resonant circuit ResI to the load side resonant circuit ResO in the non-contact manner are provided between the input side resonant circuit ResI and the load side resonant circuit ResO. The first to sixth relay coils 90a to 90f configure first to sixth resonant circuits ResA to ResF in cooperation with first to sixth relay capacitors 91a to 91f, respectively. Specifically, the electric power of the input side resonant circuit ResI is supplied to the load side resonant circuit ResO through the first to third resonant circuits ResA to ResC. The electric power of the input side resonant circuit ResI is supplied to the load side resonant circuit ResO through the fourth to sixth resonant circuits ResD to ResF. FIG. 13 illustrates an arrangement mode of the first to sixth relay coils 90a to 90f on the power transmitting pad 20 side. FIG. 13 corresponds to FIG. 4 described above.

Incidentally, in the present embodiment, the second resonant circuit ResB corresponds to "first series connection body", and the fifth resonant circuit ResE corresponds to "second series connection body". The AC power supply 82 corresponds to the "voltage applying unit".

As illustrated in FIG. 12, in the present embodiment, the respective inductances of the input side coil 80a, the load side coil 81a, and the first to sixth relay coils 90a to 90f are set to the same value "L", and the respective capacitances of the input side capacitor 80b, the load side capacitor 81b, and the first to sixth relay capacitors 91a to 91f are set to the same value "C". That is, the respective resonant frequencies fd of the input side resonant circuit ResI, the load side resonant circuit ResO, and the first to sixth resonant circuits ResA to ResF are identical with each other. The frequency fv of the output voltage of the AC power supply 82 is set to the same frequency as the above resonant frequency fd under a situation where no metal object is present on the power transmitting pad 20.

According to this setting, with the application of the AC voltage to both ends of the input side resonant circuit ResI by the AC power supply 82, the input side coil 80a is magnetically coupled with the load side coil 81a through the first to third relay coils 90a to 90c. Also, the input side coil 80a is magnetically coupled with the load side coil 81a through the fourth to sixth relay coils 90d to 90f. As a result, the electric power is transferred between the input side resonant circuit ResI and the load side resonant circuit ResO in the non-contact manner.

A first connection point N1 which is one of a pair of connection points of the second relay coil 90b and the second relay capacitor 91b in a closed circuit having the second relay coil 90b and the second relay capacitor 91b is grounded. A second connection point N2 which is one of a pair of connection points of the fifth relay coil 90e and the fifth relay capacitor 91e in a closed circuit having the fifth relay coil 90e and the fifth relay capacitor 91e is grounded. Thus, the first connection point N1 and the second connection point N2 have the same potential.

In the present embodiment, a potential difference between a third connection point N3 (corresponding to "a portion not having the same potential in the closed circuit having the first series connection body) on the opposite side of the first connection point N1 with respect to both ends of the second relay capacitor 91b, and a fourth connection point N4 (corresponding to "a portion not having the same potential in the closed circuit having the second series connection body) on the opposite side of the second connection point N2 with respect to both ends of the fifth relay capacitor 91e is detected by the voltage sensor 75.

In the present embodiment, when no metal object is present on the power transmitting pad 20, the metal object detection device is configured so that a potential of the third connection point N3 is identical with a potential of the fourth connection point N4 in phase. That is, when no metal object is present on the power transmitting pad 20, the output voltage Vout becomes "0". On the contrary, when the metal object is present on the power transmitting pad 20, and the metal object comes close to any one of the first to sixth relay coils 90a to 90f, a resonance level of the resonant circuit having the relay coil to which the metal object comes close as a component changes due to a change in impedance of the relay coil to which the metal object comes close. The resonance levels of all the resonant circuits configuring a set including the resonant circuit of which the resonance level changes, of a set of the first to third resonant circuits ResA to ResC and a set of the fourth to sixth resonant circuits ResD to ResF, change. As a result, the output voltage Vout largely changes from the reference value "0". Thus, the metal object on the power transmitting pad 20 can be detected on the basis of the output voltage Vout.

According to the present embodiment described above, the following advantages are obtained in addition to the same advantages as the advantages (i), (ii), (iv), and (v) of the above first embodiment.

(vi) Because there is no need to connect the first to sixth relay coils 90a to 90f by wiring, the degree of freedom of the arrangement of those relay coils 90a to 90f as the detection coils can be enhanced.

Seventh Embodiment

Hereinafter, a description will be given of a seventh embodiment, mainly differences from the sixth embodiment described above with reference to the drawings. In the present embodiment, a circuit configuration of a metal object detection device is changed.

Figure 14:
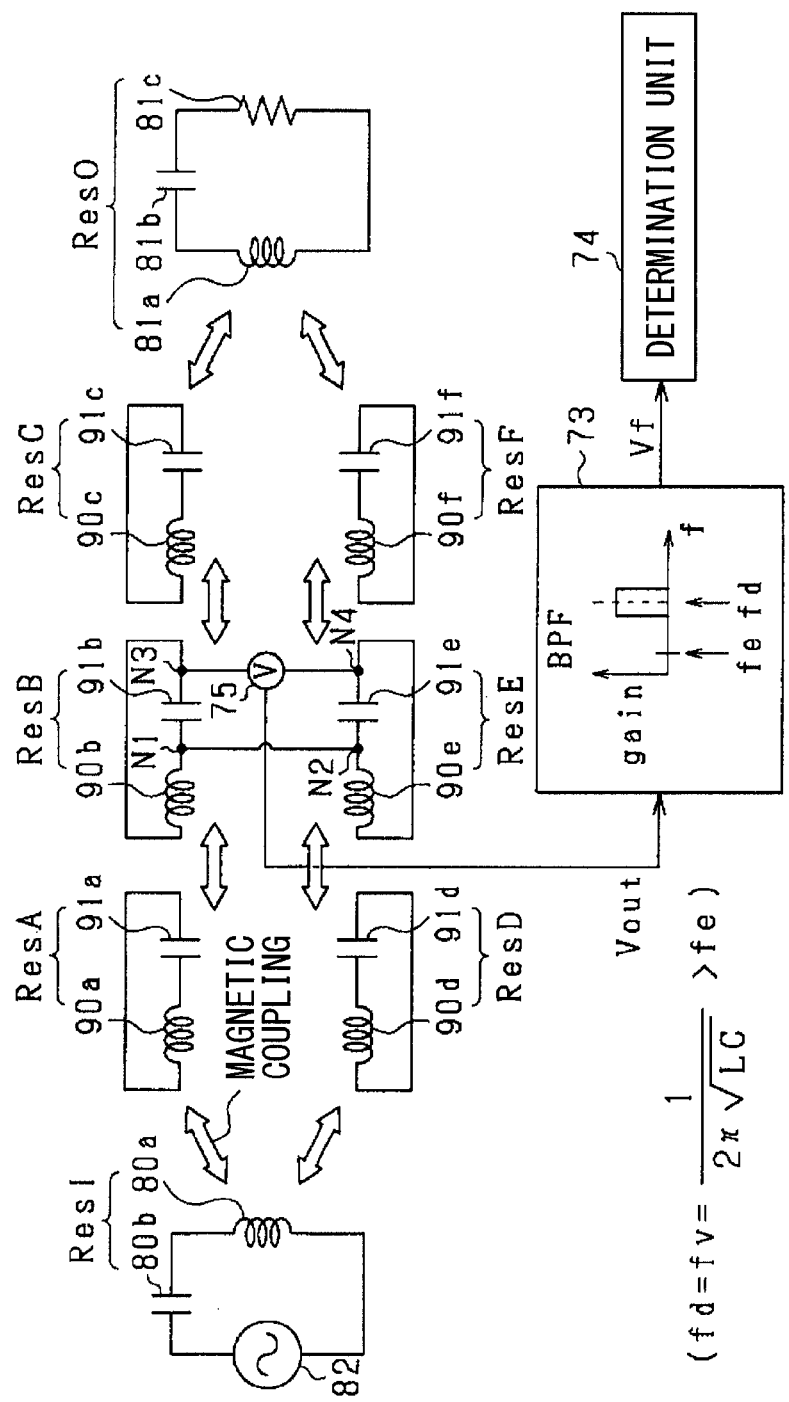
FIG. 14 is a circuit diagram of a metal object detection device according to a seventh embodiment.

FIG. 14 is a circuit diagram of the metal object detection device according to the present embodiment. In FIG. 14, the same members as the members illustrated in FIG. 12 described above are denoted by the same symbols for convenience.

As shown in the figure, in the present embodiment, the first connection point N1 and the second connection point N2 are short-circuited to each other. Thus, the first connection point N1 and the second connection point N2 can be identical in potential with each other.

Likewise, in the present embodiment described above, the same advantages as those obtained in the above sixth embodiment can be obtained.

Eighth Embodiment

Hereinafter, a description will be given of an eighth embodiment, mainly differences from the seventh embodiment described above with reference to the drawings. In the present embodiment, a circuit configuration of a metal object detection device is changed.

Figure 15:
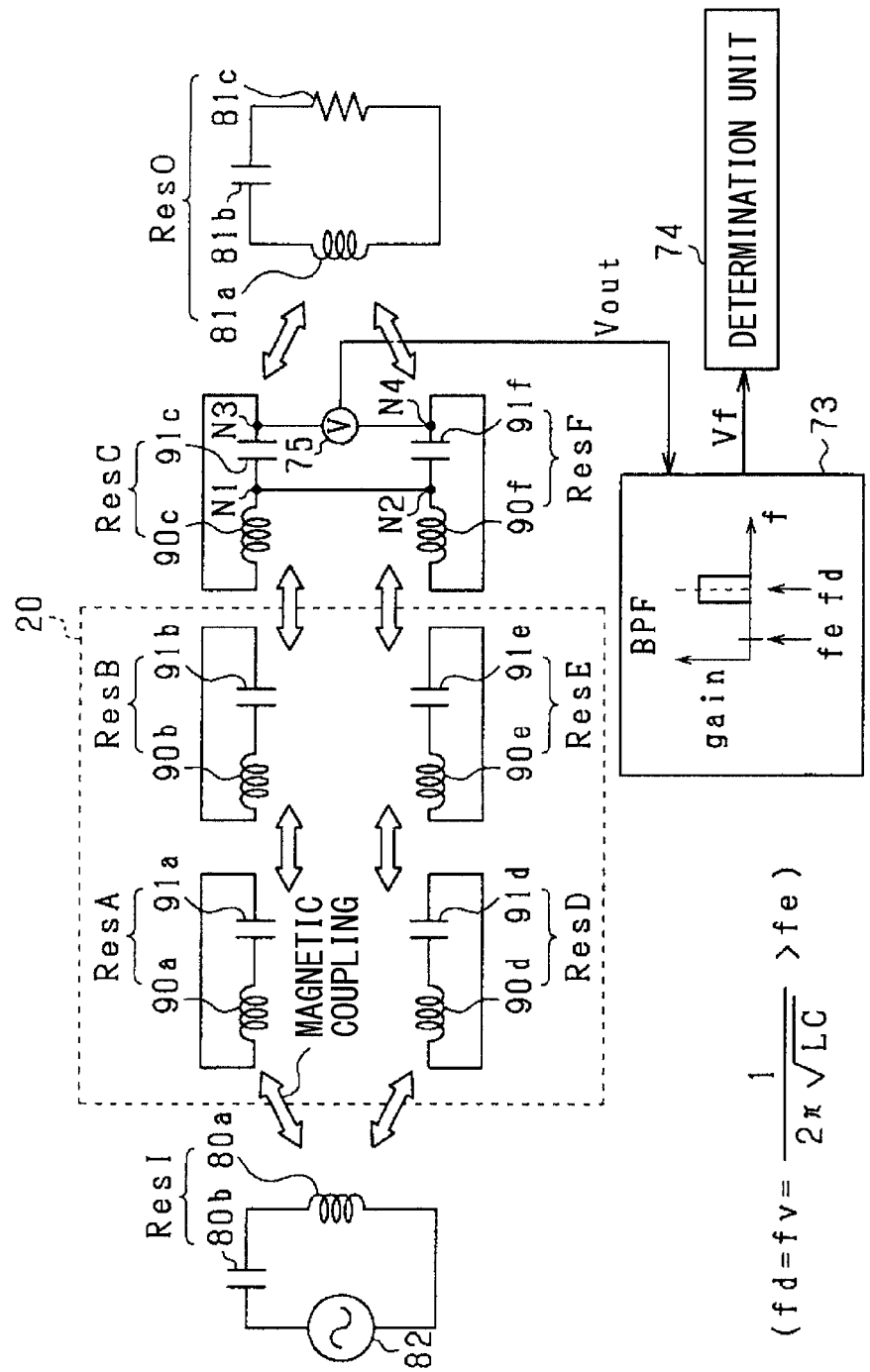
FIG. 15 is a circuit diagram of a metal object detection device according to an eighth embodiment.

FIG. 15 is a circuit diagram of the metal object detection device according to the present embodiment. In FIG. 15, the same members as the members illustrated in FIG. 14 described above are denoted by the same symbols for convenience.

As shown in the figure, in the present embodiment, first to fourth connection points N1 to N4 are changed. Specifically, it is assumed that in a closed circuit having a third relay coil 90c and a third relay capacitor 91c, a first connection point N1 is one of a pair of connection points of the third relay coil 90c and the third relay capacitor 91c. It is assumed that in a closed circuit having a sixth relay coil 90f and a sixth relay capacitor 91f, a second connection point N2 is one of a pair of connection points of the sixth relay coil 90f and the sixth relay capacitor 91f. It is assumed that a third connection point N3 is on the opposite side of the first connection point N1 with respect to both ends of the third relay capacitor 91c, and a fourth connection point N4 is on the opposite side of the second connection point N2 with respect to both ends of the sixth relay capacitor 91f. Further, a potential difference between the third connection point N3 and the fourth connection point N4 is detected by the voltage sensor 75.

In the present embodiment, the third relay coil 90c and the sixth relay coil 90f used for detection of the above potential difference by the voltage sensor 75 are arranged outside of the power transmitting pad 20. That is, the third relay coil 90c and the sixth relay coil 90f are arranged outside of a path of a main magnetic flux circulating between the primary coil 22 and the secondary coil 42.

According to such an arrangement technique, wiring for connecting the voltage sensor 75 and the third connection point N3 as well as the fourth connection point N4 becomes easy, and an influence of the main magnetic flux on the detection of the potential difference by the voltage sensor 75 can be removed.

Ninth Embodiment

Hereinafter, a description will be given of a ninth embodiment, mainly differences from the seventh embodiment described above with reference to the drawings. In the present embodiment, a circuit configuration of a metal object detection device is changed.

Figure 16:
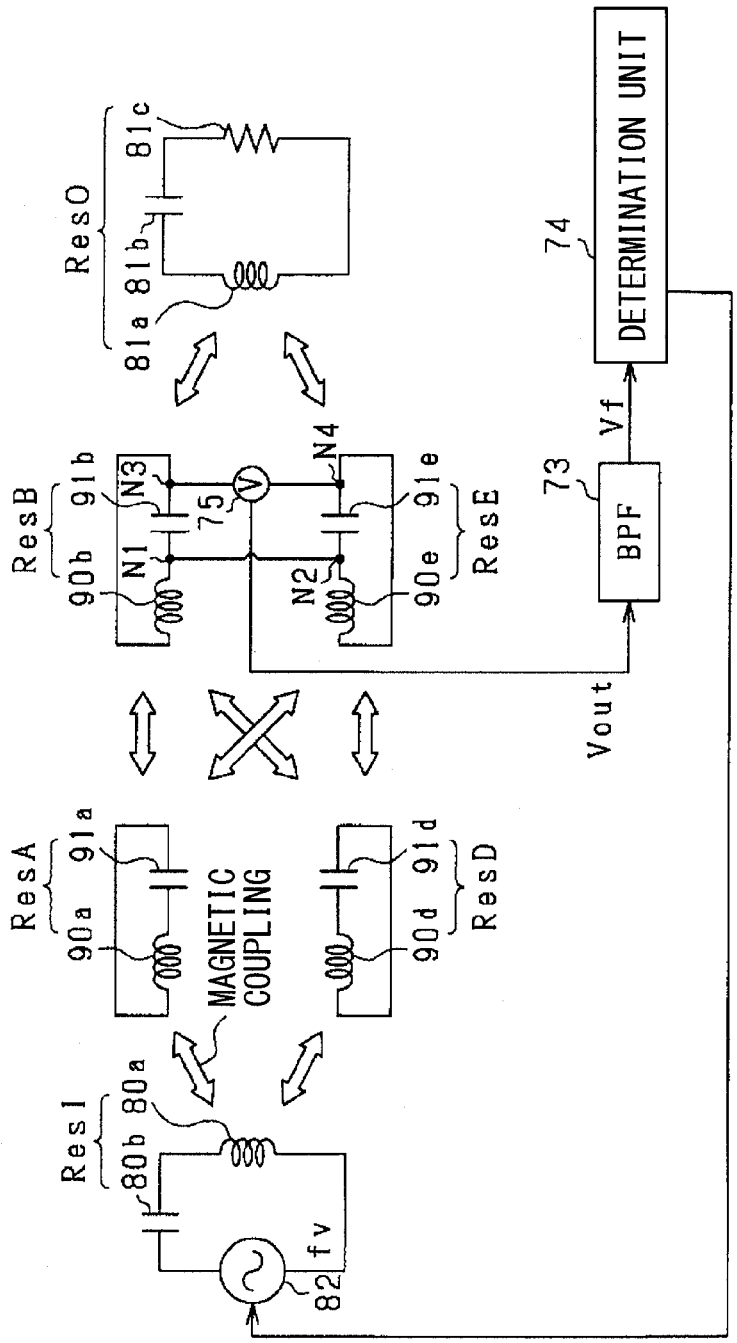
FIG. 16 is a circuit diagram of a metal object detection device according to a ninth embodiment.

FIG. 16 is a circuit diagram of the metal object detection device according to the present embodiment. In FIG. 16, the same members as the members illustrated in FIG. 14 are denoted by the same symbols for convenience. In the present embodiment, the third resonant circuit Res3 and the sixth resonant circuit Res6 are removed.

Figure 17:
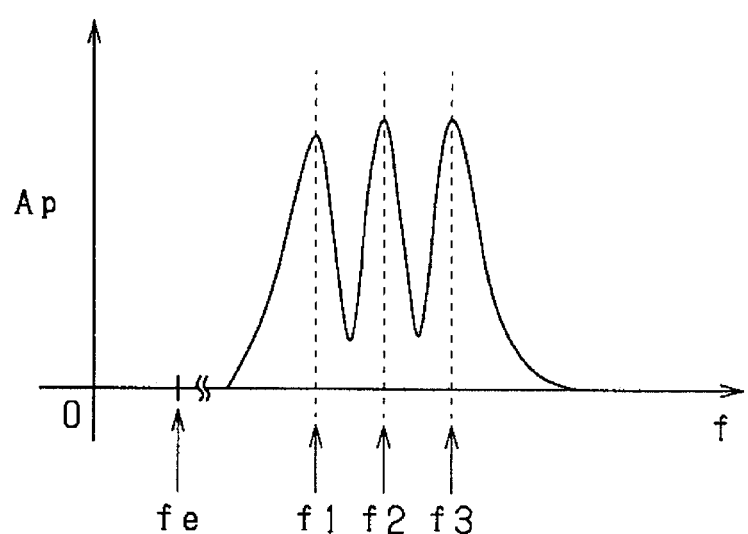
FIG. 17 is a graph illustrating a frequency characteristic of a system according to the ninth embodiment.

In the present embodiment, in a system including the input side resonant circuit ResI, the first, second, fourth, and fifth resonant circuits ResA, ResB, ResD, and ResE, and the load side resonant circuit ResO, those resonant circuits are magnetically coupled with each other whereby the system has plural resonant frequencies. FIG. 16 exemplifies a state in which magnetic coupling is performed between the first resonant circuit ResA and the fifth resonant circuit ResE, and between the second resonant circuit ResB and the fourth resonant circuit ResD, in addition to magnetic coupling in the path extending from the input side resonant circuit ResI to the load side resonant circuit ResO through the first resonant circuit ResA and the second resonant circuit ResB, and magnetic coupling in the path extending from the input side resonant circuit ResI to the load side resonant circuit ResO through the fourth resonant circuit ResD and the fifth resonant circuit ResE. In the present embodiment, as illustrated in FIG. 17, the system has three resonant frequencies f1, f2, and f3. In FIG. 17, the axis of abscissa represents a frequency f, and the axis of ordinate represents a value (hereinafter referred to as "amplitude ratio Ap") obtained by dividing the amplitude of a fluctuating potential at the third connection point N3 (or the fourth connection point N4) by the amplitude of an AC voltage output from the AC power supply 82. Hereinafter, the respective three resonant frequencies are called a first frequency f1, a second frequency f2, and a third frequency f3 in ascending order.

In the present embodiment, it is assumed that the first to third frequencies f1 to f3 are sufficiently higher than the use frequency fe of the non-contact power feeding. The filter circuit 73 is a band-pass filter including frequencies close to the first to third frequencies f1 to f3 in a passband, and the use frequency fe in a stopband for the purpose of removing the component of the use frequency fe which is superimposed on the output voltage Vout.

Subsequently, the metal object detecting process according to the present embodiment will be described.

In the present embodiment, as the above process, a process for detecting the metal object is performed on the basis of the respective output voltages Vout when the frequencies of the AC voltage to be applied to the input side resonant circuit ResI by the AC power supply 82 are the respective first to third frequencies f1 to f3.

Figure 18:
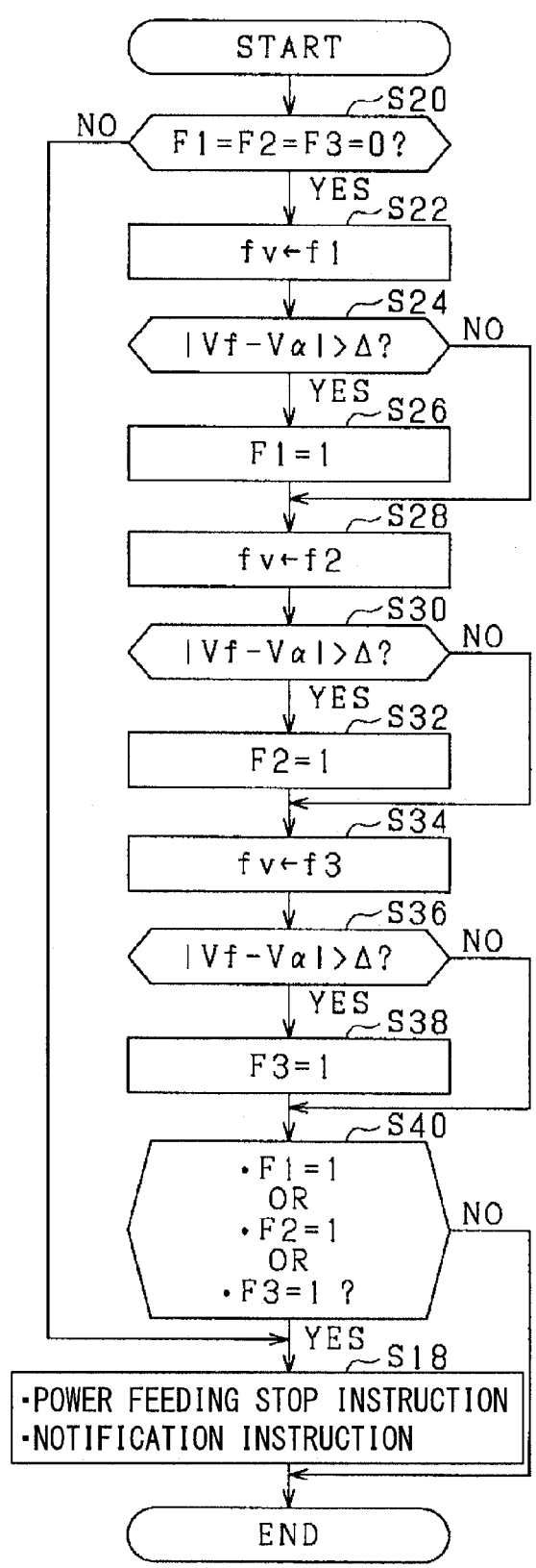
FIG. 18 is a flowchart illustrating a procedure of a metal object detecting process according to the ninth embodiment.

Subsequently, FIG. 18 illustrates a procedure of the metal object detecting process according to the present embodiment. This process is repetitively executed by the determination unit 74, for example, in a predetermined period. In the processes illustrated in FIG. 18, the same processes as the processes illustrated in FIG. 6 described above are denoted by the same step numbers for convenience.

In the series of processes, it is first determined in S20 whether all of values of the first to third detection flags F1 to F3 are "0", or not. The first to third detection flags F1 to F3 of "0" indicate that no metal object is present on the power transmitting pad 20, and the first to third detection flags F1 to F3 of "1" indicate that the metal object is present thereon. Initial values of the first to third detection flags F1 to F3 are set to "0".

When an affirmative determination is made in S20, the process proceeds to S22, and the frequency fv of the output voltage of the AC power supply 82 is set to the first frequency f1.

Subsequently in S24, it is determined whether an absolute value of the output value Vf and a specified value Vα of the filter circuit 73 exceeds a threshold value Δ, or not. In more detail, it is determined whether a latest maximum value of the absolute value exceeds the threshold value Δ, or not. This process is intended to determine whether the metal object is present on the power transmitting pad 20, or not. That is, when the metal object comes close to the detection coil that largely affects the first frequency f1 among the detection coils configuring the system, the output value Vf largely changes from "0".

If an affirmative determination is made in S24, it is determined that the metal object is present, and the process proceeds to S26. In S26, the value of the first detection flag F1 is set to "1".

When the process in S26 is completed, or when a negative determination is made in S24 described above, the process proceeds to S28, and the frequency fv of the output voltage of the AC power supply 82 is set to the second frequency f2.

Subsequently, in S30, the same process as that in S24 described above is performed. When the affirmative determination is made in S30, the process proceeds to S32, and the value of the second detection flag F2 is set to "1".

When the process in S32 is completed, or when a negative determination is made in S30 described above, the process proceeds to S34, and the frequency fv of the output voltage of the AC power supply 82 is set to the third frequency f3.

Subsequently, in S36, the same process as that in S24 described above is performed. When the affirmative determination is made in S36, the process proceeds to S38, and the value of the third detection flag F3 is set to "1".

When the process in S38 is completed, or when a negative determination is made in S36 described above, the process proceeds to S40, and it is determined whether a logical sum of a condition that the value of the first detection flag F1 is "1", a condition that the value of the second detection flag F2 is "1", and a condition that the value of the third detection flag F3 is "1" is true, or not. When the affirmative determination is made in S40, or when the negative determination is made in S20 described above, the process proceeds to S18.

When the negative determination is made in S40, or when the process in S18 is completed, the series of processes is terminated once.

Likewise, in the present embodiment described above, the metal object can be detected with high precision.

Tenth Embodiment

Hereinafter, a description will be given of a tenth embodiment, mainly differences from the ninth embodiment described above with reference to the drawings. In the present embodiment, a circuit configuration of a metal object detection device is changed.

Figure 19:
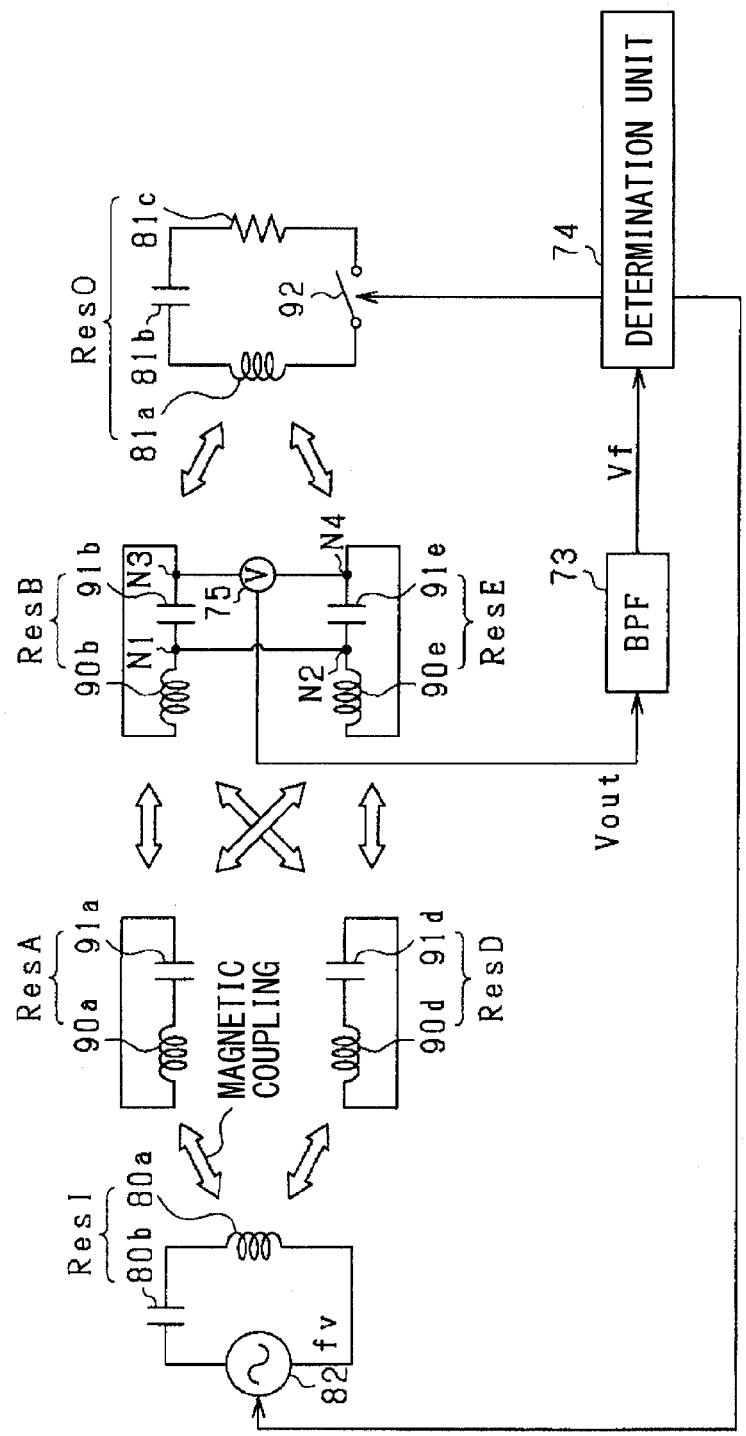
FIG. 19 is a circuit diagram of a metal object detection device according to a tenth embodiment.

FIG. 19 is a circuit diagram of the metal object detection device according to the present embodiment. In FIG. 19, the same members as the members illustrated in FIG. 16 are denoted by the same symbols for convenience.

As shown in the figure, in the present embodiment, a switch 92 is disposed in the load side resonant circuit ResO. The switch 92 has a function of switching the load side resonant circuit ResO to an open state or a closed state.

Figure 20:
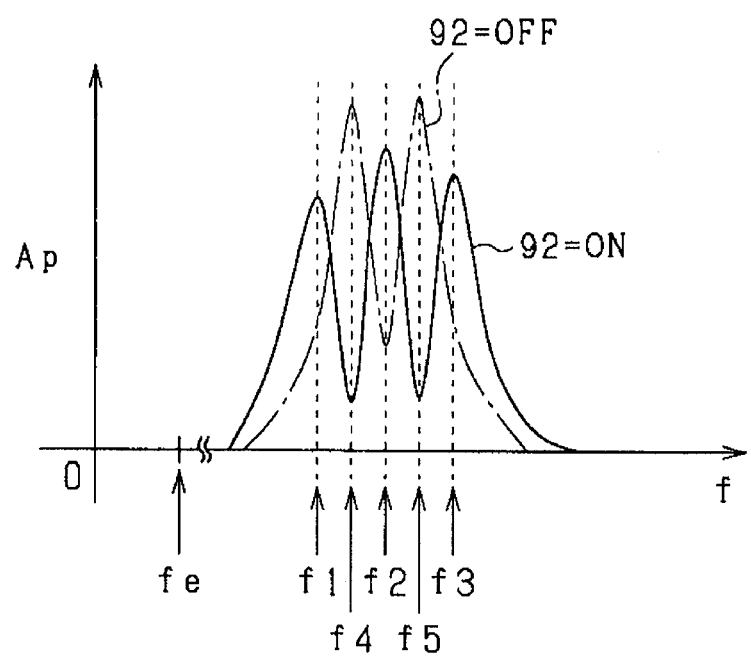
FIG. 20 is a graph illustrating a frequency characteristic of a system according to a tenth embodiment.

In the present embodiment, the resonant frequency of the system is different depending on an operation state of the switch 92. FIG. 20 illustrates an example in which the resonant frequency changes depending on the operation state of the switch 92. In the present embodiment, when the switch 92 is turned on, it is assumed that the resonant frequency of the system is identical with that illustrated in FIG. 17 described above. On the other hand, when the switch 92 is turned off, it is assumed that the resonant frequency of the system is a fourth frequency f4 between the first frequency f1 and the second frequency f2, and a fifth frequency f5 between the second frequency f2 and the third frequency f3.

Subsequently, the metal object detecting process according to the present embodiment will be described.

In the present embodiment, as the above process, a process for detecting the metal object is performed on the basis of the respective output voltages Vout when the operation state of the switch 92 is changed to two kinds of states. Such a detection technique is employed for the following reasons.

That is, in the system (system illustrated in FIG. 19 described above) when the switch 92 is turned on, since the resonant frequency of the system becomes the first to third frequencies f1 to f3, the amplitude ratio Ap of the system at the fourth and fifth frequencies f4 and f5 becomes small. In this situation, when the metal object comes close to the detection coil that largely affects, for example, the fifth frequency f5 on the power transmitting pad 20, even if the frequency fv of the output voltage of the AC power supply 82 is set to the fifth frequency f5, there is a concern that the metal object cannot be detected with high precision since the amplitude ratio Ap is small. That is, there is a concern that the detection precision of the metal object is lowered depending on a magnetic coupling state between the plural resonant circuits configuring the system.

To cope with the above problem, the operation state of the switch 92 is changed to change a magnetic coupling state between the resonant circuits configuring the system. In the present embodiment, with a change in the magnetic coupling state, for example, the amplitude ratio Ap of the fifth frequency f5 increases. This makes it possible to avoid a reduction in the detection precision of the metal object.

Figure 21:
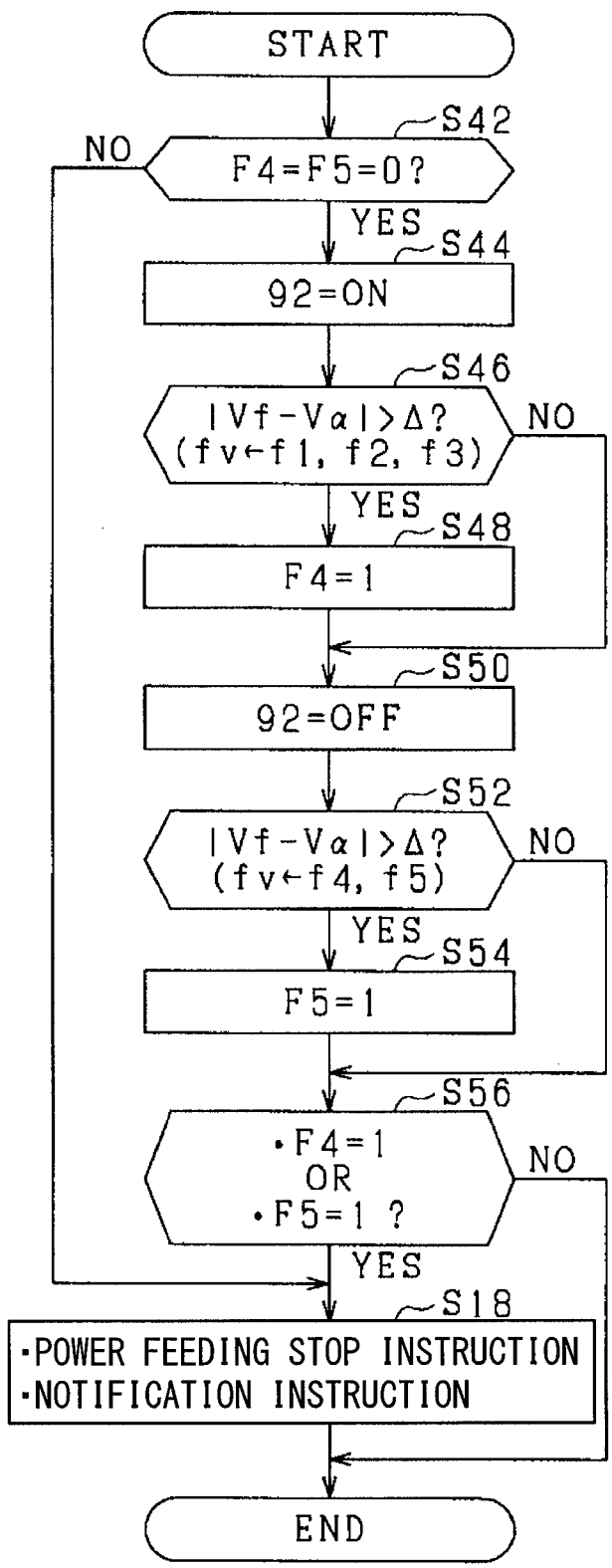
FIG. 21 is a flowchart illustrating a procedure of a metal object detecting process according to the tenth embodiment.

FIG. 21 illustrates a procedure of the metal object detecting process according to the present embodiment. This process is repetitively executed by the determination unit 74, for example, in a predetermined period. In the processes illustrated in FIG. 21, the same processes as the processes illustrated in FIG. 18 described above are denoted by the same step numbers for convenience.

In the series of processes, it is first determined in S42 whether all of the value of the fourth detection flag F4 and the value of the fifth detection flag F5 are "0", or not. The fourth detection flag F4 of "0" indicates that no metal object is present when the switch 92 is turned on, and the fourth detection flag F4 of "1" indicates that the metal object is present. The fifth detection flag F5 of "0" indicates that no metal object is present when the switch 92 is turned off, and the fifth detection flag F5 of "1" indicates that the metal object is present. Initial values of the fourth and fifth detection flags F4 and F5 are set to "0".

When the affirmative determination is made in S42, the process proceeds to S44, and the switch 92 is turned on.

Subsequently in S46, it is determined whether an absolute value of a difference between the output value Vf and the specified value Vα of the filter circuit 73 exceeds a threshold value Δ, or not, at at least one frequency when the frequencies fv of the output voltage of the AC power supply 82 correspond to the respective first to third frequencies f1 to f3. When the affirmative determination is made in S46, the process proceeds to S48, and a value of the fourth detection flag F4 is set to "1".

When the process in S48 is completed, or when a negative determination is made in S46 described above, the process proceeds to S50, and the switch 92 is turned off.

Subsequently in S52, it is determined whether an absolute value of a difference between the output value Vf and the specified value Vα of the filter circuit 73 exceeds a threshold value Δ, or not, at at least one frequency when the frequencies fv of the output voltage of the AC power supply 82 correspond to the respective fourth and fifth frequencies f4 to f5. When the affirmative determination is made in S52, the process proceeds to S54, and the value of the fifth detection flag F5 is set to "1".

When the process in S54 is completed, or when a negative determination is made in S52 described above, the process proceeds to S56, and it is determined whether a logical sum of a condition that the value of the fourth detection flag F4 is "1", and a condition that the value of the fifth detection flag F5 is "1" is true, or not. When the affirmative determination is made in S56, or when the negative determination is made in S42 described above, the process proceeds to S18.

When the negative determination is made in the above S56, or when the process in S18 is completed, the series of processes is terminated once.

Likewise, in the present embodiment described above, the metal object can be detected with high precision.

The above first to tenth embodiments may be implemented as follows.

The arrangement technique of "the detection coils" is not limited to the techniques exemplified in the respective embodiments. For example, if the power transmitting pad 20 is installed in a power equipment arranged above the vehicle 10, because it is conceivable that the power receiving pad 40 is disposed on an upper part of the vehicle, the detection coils may be arranged on the power receiving pad 40. Even in this case, the metal object present in the path of the magnetic flux generated by the primary coil 22 and the secondary coil 42 can be intended to be detected by the detection coils. For example, in the power equipment in which the power transmitting pad 20 is arranged behind the vehicle 10, because it is conceivable that the power receiving pad 40 is disposed at the rear of the vehicle 10, the detection coil may be arranged on at least one of the power transmitting pad 20 and the power receiving pad 40. Even in this case, since there is a risk that the metal object adheres to the power transmitting pad 20 or the power receiving pad 40, the application of the present disclosure is effective.

Figure 22:
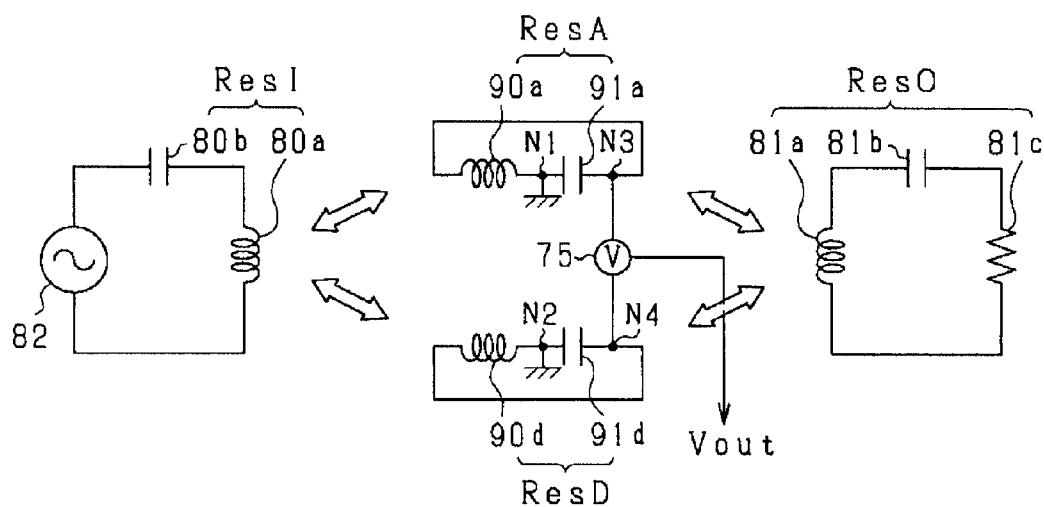
FIG. 22 is a circuit diagram of a metal object detection device according to another embodiment.

The number of resonant circuits having the relay coils as components is not limited to the number exemplified in the sixth embodiment. FIG. 22 illustrates a case in which the number of resonant circuits having the relay coils as the components is two. In FIG. 22, the same members as the members illustrated in FIG. 12 are denoted by the same symbols for convenience.

Figure 23:
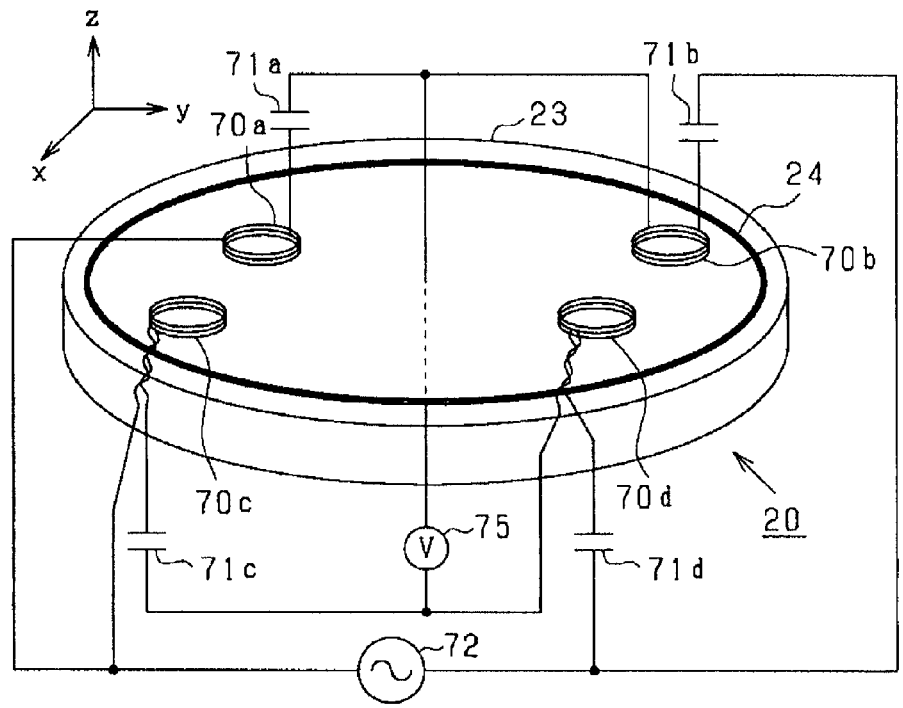
FIG. 23 is a diagram illustrating the arrangement of detection coils in a power transmitting pad according to another embodiment.

The shapes of the primary core 21 and the secondary core 41 are not limited to that illustrated in FIG. 2 described above. For example, the shape may be a circular core. FIG. 23 exemplifies a circular primary core 23. In FIG. 23, the primary coil is indicated by "24". In FIG. 23, the same members as the members illustrated in FIG. 4 are denoted by the same symbols for convenience.

The AC power supply as "the voltage applying unit" is not limited to a single AC power supply that is connected in parallel to the parallel connection body of "the first series connection body" and "the second series connection body". For example, the AC power supply may be connected in parallel to each of "the first series connection body" and "the second series connection body".

"The first passive element" and "the second passive element" are not limited to the coils (detection coils) described in the above fourth embodiment, but may be capacitors. Also, "the first passive element" and "the second passive element" are not limited to reactance elements such as coils or capacitors, but may be resistors.

The setting of the resonant frequency fd of the first to fourth resonant circuits Res1 to Res4, and the frequency fv of the output voltage of the AC power supply 72 is not limited to the setting exemplified in the above first embodiment. As the frequency fv of the output voltage of the AC power supply 72 is more away from the resonant frequency fd of the first to fourth resonant circuits Res1 to Res4, a variation in the impedance of the resonant circuit per unit variation of the resonant frequency fd is smaller. Therefore, the frequency fv may be appropriately set according to a request for the detection precision of the metal object.

In the above first embodiment, the first to fourth resonant circuits Res1 to Res4 are configured so that the impedances at the frequency fv of the output voltage of the AC power supply 72 are identical with each other. However, the present disclosure is not limited to this configuration, and the first to fourth resonant circuits Res1 to Res4 may be configured so that the impedances may be different from each other. In this case, in each of the first to fourth resonant circuits Res1 to Res4, the specifications of the detection coil and the capacitor are made different in each of the resonant circuits in order to make the resonant frequency fd and the frequency fv of the output voltage of the AC power supply 72 identical with each other.

In the above first embodiment, a first voltage sensor for detecting the potential of the connection point between the first resonant circuit Res1 and the second resonant circuit Res2, and a second voltage sensor for detecting the potential of the connection point between the third resonant circuit Res3 and the fourth resonant circuit Res4 may be provided, and the metal object detecting process may be performed on the basis of a difference between the respective detection values of those voltage sensors.

The resonant frequency fd of the resonant circuit may be set to a frequency lower than the frequency of the voltage applied to the primary coil 22 when the non-contact power feeding is performed. Specifically it is desirable that the resonant frequency fd is set to half or lower of the frequency of the above voltage. Even in this case, the current can be restrained from flowing through the detection coils by allowing the main magnetic flux to pass through the detection coils.

In the above first embodiment, a circuit in which two series connection bodies of the series resonant circuits each including the detection coil and the capacitor are connected in parallel to each other is installed in the metal object detection device. However, the present disclosure is not limited to this configuration, but a circuit in which three or more series connection bodies are connected in parallel to each other may be provided. In this case, one series connection body arbitrarily selected from the series connection bodies configuring the circuits in which the series connection bodies are connected in parallel is set as "a first series connection body", and one series connection body arbitrarily selected from the remaining series connection bodies is set as "a second series connection body". The metal object detecting process may be performed on the basis of a difference between a potential of the connection point between the series connection bodies of a pair of resonant circuits configuring the first series connection body, and a potential of the connection point between the series connection bodies of a pair of resonant circuits configuring the second series connection body.

"The filter unit" is not limited to the band-pass filter, but may be a high-pass filter.

Figure 24:
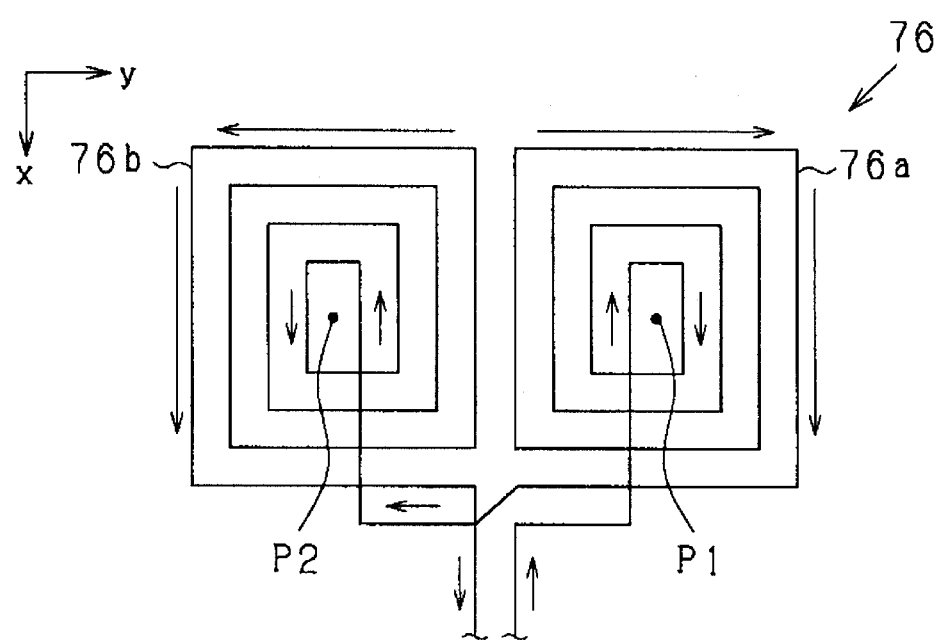
FIG. 24 is a diagram illustrating the shape of detection coils according to another embodiment.

"The detection coil" including the portion in which the induced current flows in the predetermined direction, and the portion in which the induced current flows in the direction opposite to the predetermined direction when the main magnetic flux passes through the detection coil is not limited to the detection coil described in the above third embodiment. The coil of this type may be configured, for example, as illustrated in FIG. 24. In detail, a detection coil 76 is configured by a series connection body of a first winding part 76a wound around a first axis P1 in a specified direction, and a second winding part 76b wound around a second axis P2 in a direction opposite to the direction of the first winding part 76a. The first axis P1 and the second axis P2 are in parallel to each other, and spaced from each other. The first winding part 76a and the second winding part 76b are formed on a single plane (on a plane parallel to the plate surface of the primary core 21) orthogonal to the first axis P1 and the second axis P2. That is, the detection coil 76 is a planar coil having a winding start and a winding end on both ends of the series connection body of the first winding part 76a and the second winding part 76b. Even in this shape, the current can be restrained from flowing through the detection coils by allowing the main magnetic flux to pass through the detection coils.

FIG. 24 illustrates the detection coil 76 in which each of the first winding part 76a and the second winding part 76b configuring the detection coil 76 is formed in a spiral shape when the winding parts 76a and 76b are viewed from the first axis P1 direction and the second axis P2 direction, respectively.

The metal object detection device may be equipped with plural sets of first series connection bodies and second series connection bodies for the purpose of spreading the detection region of the metal object.

In the above ninth embodiment, the resonant frequencies provided in the system are not limited to three if plural resonant frequencies are provided. Likewise, in this case, the metal object detecting process can be performed on the basis of the respective output voltages Vout when the frequencies of the output voltage of the AC power supply 82 are the respective resonant frequencies of the system.

In the above tenth embodiment, switches may be disposed in a part and two or more of the first to sixth resonant circuits ResA to ResF and the load side resonant circuit ResO. Likewise, in this case, the magnetic coupling state between the plural resonant circuits configuring the system changes according to the operation state of the plural switches, and the resonant frequencies of the system can change. Thus, the metal object detecting process can be performed on the basis of the respective output voltages Vout when the operation state of the plural switches is changed to plural kinds of states.

Eleventh Embodiment

Subsequently, a description will be given of the metal object detection device according to an eleventh embodiment of the present disclosure with reference to FIGS. 25 to 28, 29A, and 29B. The metal object detection device according to the present embodiment is also provided in the power transmitting system of the non-contact power feeding system.

Figure 25:
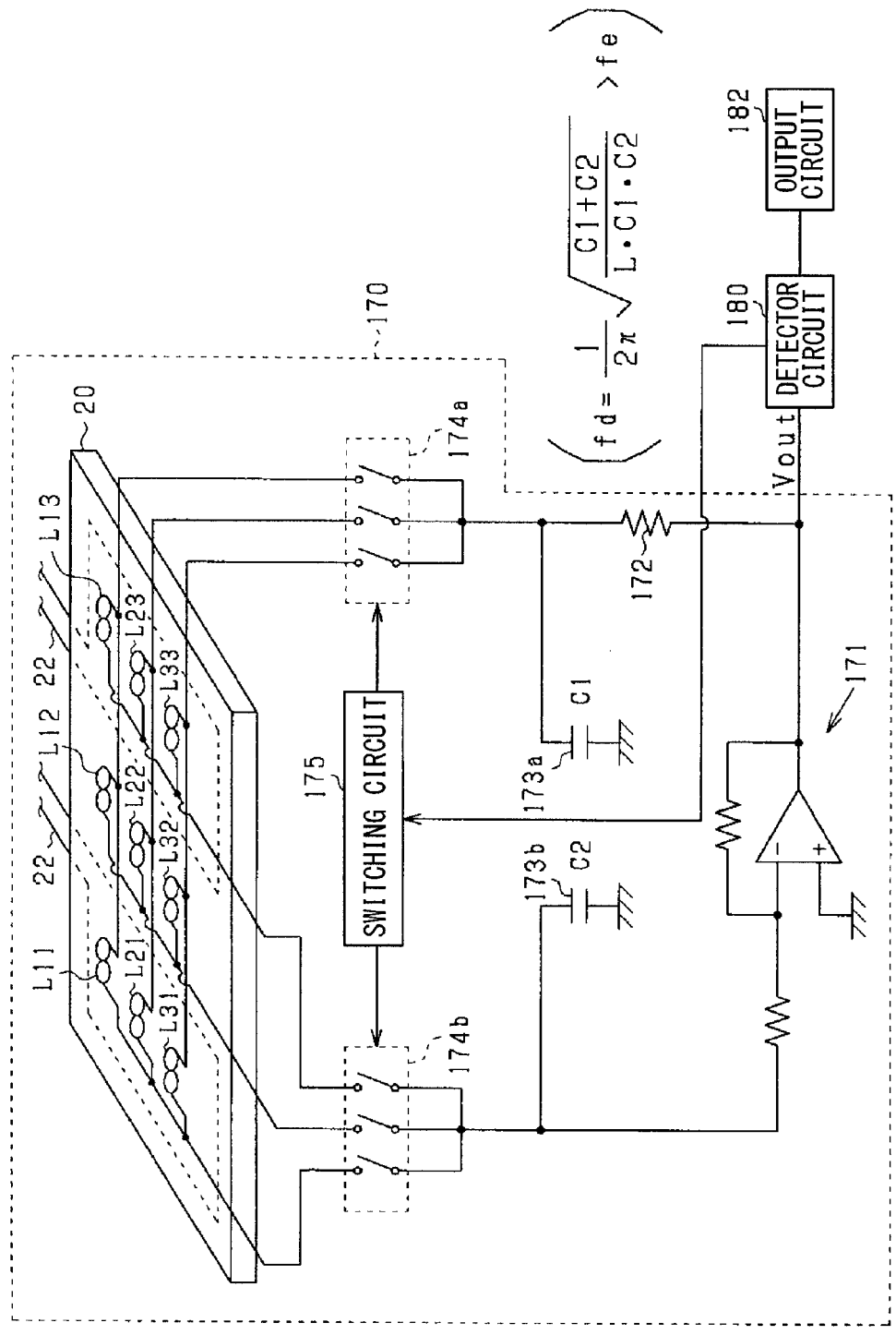
FIG. 25 is a circuit diagram of a metal object detection device according to an eleventh embodiment.

As illustrated in FIG. 25, the metal object detection device includes an oscillator circuit 170, a detector circuit 180, and an output circuit 182. In the present embodiment, the oscillator circuit 170 is a colpitts oscillator circuit, and includes an inverting amplifier circuit 171, a resistor 172, a first capacitor 173a, a second capacitor 173b, and plural detection coils Lij (i=1 to 3, j=1 to 3). In detail, an output terminal of the inverting amplifier circuit 171 is connected to one end of the resistor 172, and the other end of the resistor 172 is connected to respective one ends of the plural detection coils Lij through a first switch 174a. The respective other ends of the plural detection coils Lij are connected to an inverting input terminal side of the inverting amplifier circuit 171 through a second switch 174b. The first switch 174a and the second switch 174b are operated by a switching circuit 175 to connect any one of the plural detection coils Lij between the other end of the resistor 172 and the inverting input terminal side of the inverting amplifier circuit 171.

A connection between the other end of the resistor 172 and the first switch 174a is grounded through the first capacitor 173a. A connection between the inverting input terminal side of the inverting amplifier circuit 171 and the second switch 174b is grounded through the second capacitor 173b.

In the present embodiment, the oscillator circuit 170 corresponds to a supply unit. The first switch 174a and the second switch 174b configure a connection part.

In the figure, a capacitance of the first capacitor 173a is indicated by "C1", and a capacitance of the second capacitor 173b is indicated by "C2". In the present embodiment, the respective detection coils Lij are formed of coils having the same specification (shape, material, etc.).

When the oscillation frequency fd of the oscillator circuit 170 is represented by the following equation (eq3) assuming that the respective inductances of the detection coils Lij are "L".

[Equation 3]

$$f_d = \frac{1}{2\pi}\sqrt{\frac{C_1 + C_2}{L \cdot C_1 \cdot C_2}} \quad \text{(eq 3)}$$

In the present embodiment, the oscillation frequency fd of the oscillator circuit 170 is set to a frequency higher than the use frequency fe (frequency of a voltage to be applied to the primary coil 22, for example, several kHz to tens of MHz) of the non-contact power feeding.

In the present embodiment, the detection coils Lij can be patterned on, for example, a flexible substrate. Further, it is assumed that the power transmitting pad 20 is really configured so that the detection coils Lij are arranged above the primary coil 22, and the primary core 21, the primary coil 22, and the detection coils Lij are molded with resin. That is, the detection coils Lij are embedded in the power transmitting pad 20. As with the power transmitting pad 20, it is assumed that the power receiving pad 40 is configured so that the secondary core 41 and the secondary coil 42 are molded with resin.

Figure 26:
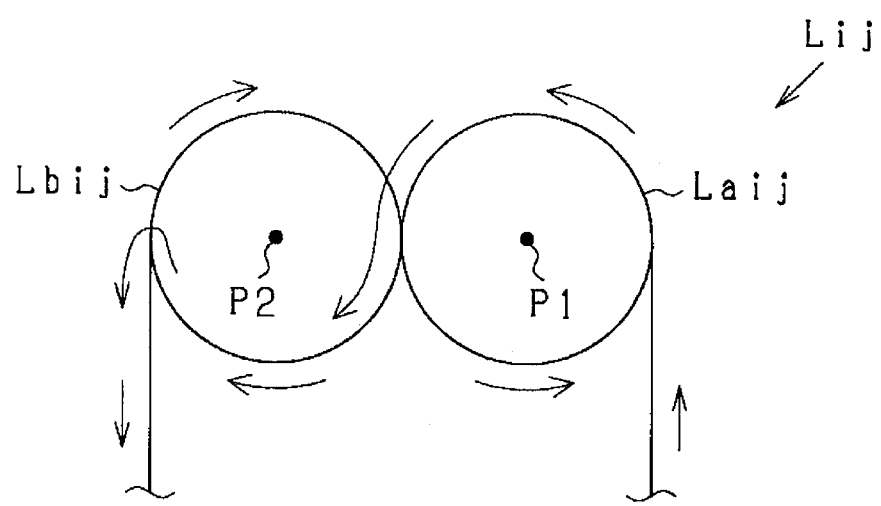
FIG. 26 is a diagram illustrating the shape of detection coils according to the eleventh embodiment.

As illustrated in FIG. 26, the detection coils Lij are configured to detect the metal object as a foreign matter present on the power transmitting pad 20, and are 8-shaped coils in the present embodiment. In detail, the detection coils Lij each include a portion in which an induced current flows in a predetermined direction, and a portion in which the induced current flows in a direction opposite to the predetermined direction when a main magnetic flux circulating between the primary coil 22 and the secondary coil 42 passes through the detection coils Lij. In more detail, as the two portions, the detection coils Lij are each configured by a series connection body of a first winding part Laij wound around a first axis P1 in a specified direction, and a second winding part Lbij wound around a second axis P2 in a direction opposite to the direction of the first winding part Laij. The first axis P1 and the second axis P2 are in parallel to each other, and spaced from each other. The first winding part Laij and the second winding part Lbij are formed on a single plane orthogonal to the first axis P1 and the second axis P2. That is, each of the detection coils Lij is a planar coil having a winding start and a winding end on both ends of the series connection body of the first winding part Laij and the second winding part Lbij.

Figure 27:
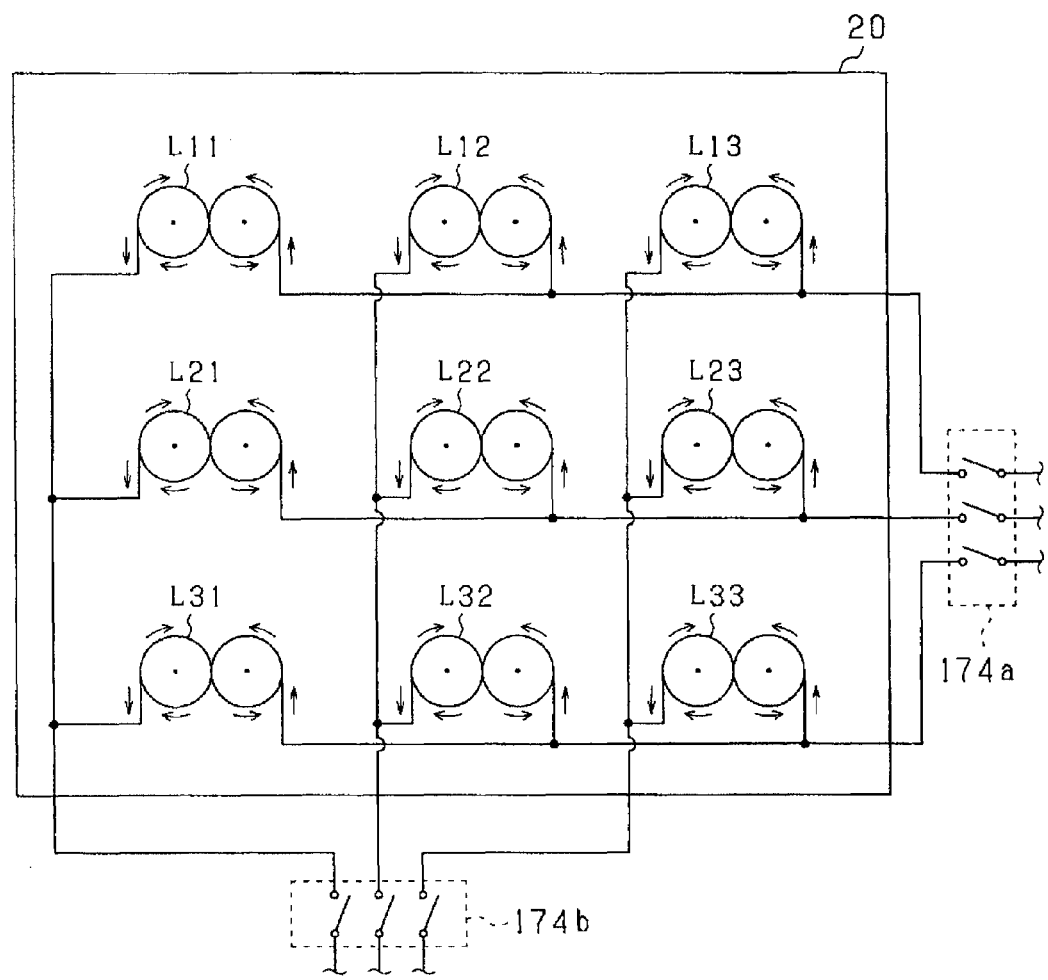
FIG. 27 is a diagram illustrating the arrangement of detection coils in the power transmitting pad according to the eleventh embodiment.

As illustrated in FIG. 27, the detection coils Lij are so arranged as to detect the metal object present on a path of a magnetic flux generated by at least one of the primary coil 22 and the secondary coil 42. In the present embodiment, the detection coils Lij are arrayed so that the plane on which the coils are formed is in parallel to the plate surface (plate surface of the primary spacing parts 21a) of the power transmitting pad 20. Incidentally, in the arrangement of the detection coils Lij, the detection of the metal object present in the path of the magnetic flux generated by at least one of the primary coil 22 and the secondary coil 42 is enabled by the presence of a leakage magnetic flux from one of those coils 22 and 42 in addition to the main magnetic flux circulating between those coils 22 and 42.

In the present embodiment, the oscillation frequency fd is set under a situation where no object is present on the power transmitting pad 20. Thus, when the metal object is present on the power transmitting pad 20, and the metal object comes close to the detection coils Lij, an eddy current loss is caused by electromagnetic induction. As a result, the impedance of the detection coils Lij reduces due to an increase in the resistance and an increase or decrease in the inductance of the detection coils Lij, and the output voltage Vout of the oscillator circuit 170 decreases. Therefore, according to the output voltage Vout, the metal object on the power transmitting pad 20 can be detected.

A configuration in which the metal object on the power transmitting pad 20 is detected with the detection coils Lij as the components of the oscillator circuit 170 is employed for the purpose of enhancing the detection precision of the metal object. That is, as the metal object on the power transmitting pad 20 is smaller, a change in the impedance of the detection coils Lij becomes smaller. With the adjustment of the gain of the oscillator circuit 170, because the sensitivity caused by a change in the impedance can be improved, the detection precision of the metal object can be enhanced.

Figure 28:
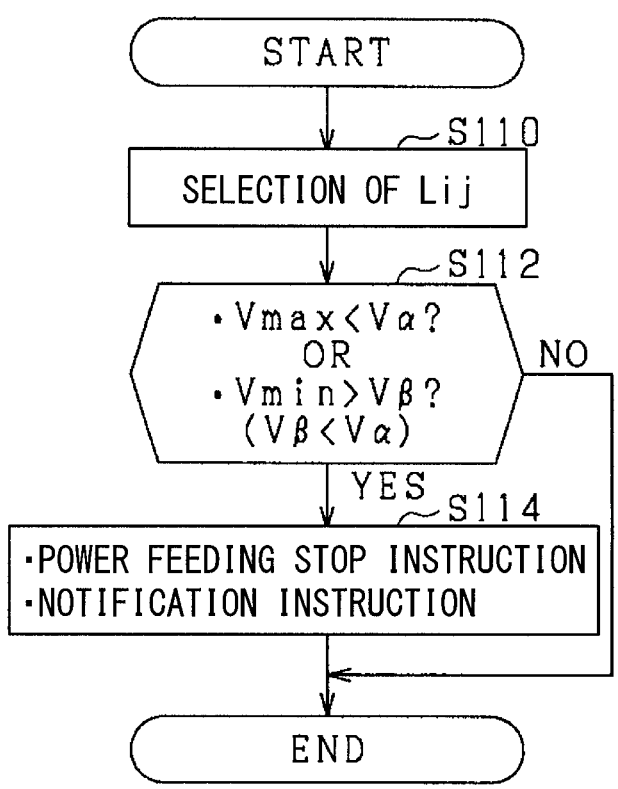
FIG. 28 is a flowchart illustrating a procedure of a metal object detecting process according to the eleventh embodiment.

FIG. 28 illustrates a procedure of the metal object detecting process according to the present embodiment. This process is repetitively executed by the detector circuit 180, for example, in a predetermined period with turning on of the power supply of the oscillator circuit 170 as a trigger. In the present embodiment, the detector circuit 180 corresponds to a processing unit and a detection unit.

In the series of processes, first in S110, the detection coils Lij as the components of the oscillator circuit 170 are selected. This process is performed by instructing the switching circuit 175 to operate the first switch 174a and the second switch 174b. According to this process, the detection coils configuring the oscillator circuit 170 are sequentially switched every process period.

Figure 29A:
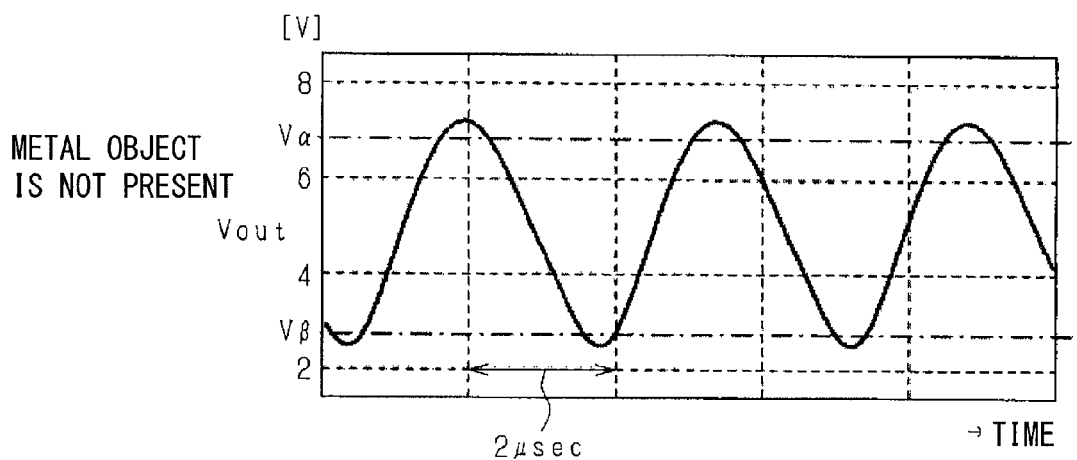
FIG. 29A is a graph illustrating an output voltage of a metal object oscillator circuit when no metal object is present according to the eleventh embodiment.
Figure 29B:
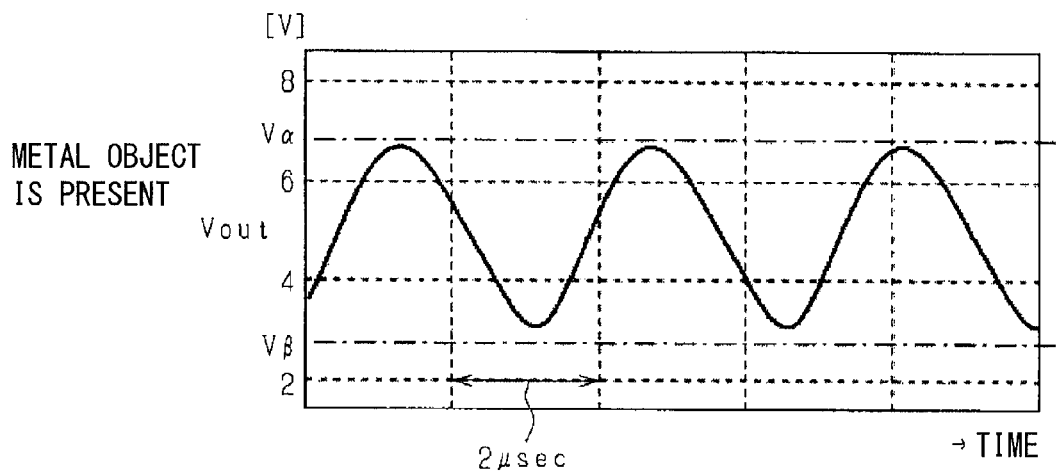
FIG. 29B is a graph illustrating an output voltage of a metal object oscillator circuit when a metal object is present according to the eleventh embodiment.

In subsequent S112, it is determined whether a logical sum of a condition in which a latest maximum value Vmax (also called "peak value") of the output voltage Vout of the oscillator circuit 170 is lower than an upper limit voltage Vα (>0), and a condition in which a latest minimum value Vmin of the output voltage Vout is lower than a lower limit voltage Vβ (>0) lower than the upper limit voltage Vα is true, or not. This process is intended to determine whether the metal object is present on the power transmitting pad 20, or not. In other words, as illustrated in FIGS. 29A and 29B, when the metal object is present on the power transmitting pad 20, the amplitude of the output voltage Vout of the oscillator circuit 170 is reduced with the results that the maximum value Vmax of the output voltage becomes lower than the upper voltage Vα, or the minimum value Vmin of the output voltage exceeds a lower limit voltage Vβ.

As illustrated in FIG. 28, if an affirmative determination is made in S112, it is determined that the metal object is present on the power transmitting pad 20, and the process proceeds to S114. In S114, stop of the power supply to the power receiving pad 40 from the power transmitting pad 20, and notification of a fact that the metal object is present to the user are instructed to the output circuit 182 illustrated in FIG. 25 described above. As a result, the output circuit 182 instructs the power transmitting circuit 30 to stop the power supply from the power transmitting pad 20 to the power receiving pad 40. Also, the user is notified of the fact that the metal object is present by some notification unit.

When it is determined that the metal object is present, a stop instruction of power feeding or a notification instruction to the output circuit 182 is continued until it is then determined that the metal object has been removed from the power transmitting pad 20.

When the negative determination is made in the above S112, or when the process in S114 is completed, the series of processes is terminated once.

According to the present embodiment described above in detail, the following advantages are obtained.

The detection coils Lij are each configured as a series connection body of the first winding part Laij wound around the first axis P1 in the specified direction, and the second winding part Lbij wound around the second axis P2 in the direction opposite to the specified direction. Thus, a current can be restrained from flowing through the detection coils Lij by the main magnetic flux circulating between the primary coil 22 and the secondary coil 42. The situation in which the reliability of the metal object detection device is lowered can be avoided, and the reduction in the power transmission efficiency from the primary coil 22 to the secondary coil 42 can be suppressed. Likewise, in the non-contact power feeding, the metal object on the power transmitting pad 20 can be detected by the metal object detecting process.

In particular, in the present embodiment, the first winding part Laij and the second winding part Lbij are formed on a signal plane parallel to the surface of the power transmitting pad 20 which faces the power receiving pad 40. That is, when the non-contact power feeding is performed, the detection coils Lij are arranged so that the main magnetic flux passing through the first winding part Laij becomes equal to the main magnetic flux passing through the second winding part Lbij. Thus, the effect of restraining the current from flowing through the detection coils Lij by the main magnetic flux circulating between the primary coil 22 and the secondary coil 42 can increase.

The detection coils Lij configuring the oscillator circuit 170 are sequentially changed by the operation of the first switch 174$a$ and the second switch 174$b$ every process period of the detector circuit 180. Thus, for example, as compared with a configuration having the oscillator circuit 170 and the detector circuit 180 corresponding to the respective detection coils Lij, the numbers of oscillator circuits 170 and detector circuits 180 required for detecting a change in the impedance of the detection coils Lij can be reduced.

The metal object detecting process based on the amplitude of the output voltage Vout is performed. Accordingly, the metal object can be appropriately detected.

Twelfth Embodiment

Hereinafter, a description will be given of a twelfth embodiment, mainly differences from the eleventh embodiment described above with reference to the drawings. In the present embodiment, a technique for the metal object detecting process is changed.

Figure 30:
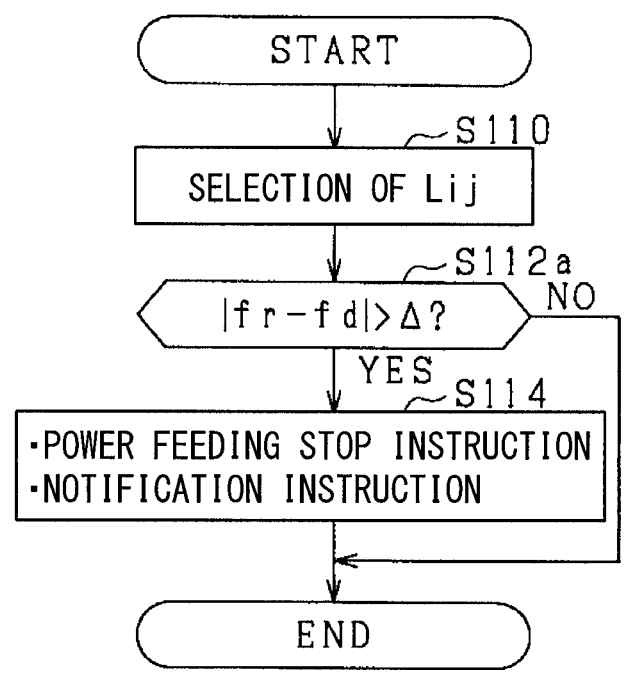
FIG. 30 is a flowchart illustrating a procedure of a metal object detecting process according to a twelfth embodiment.

FIG. 30 illustrates a procedure of the metal object detecting process according to the present embodiment. This process is repetitively executed by the detector circuit 180, for example, in a predetermined period with turning on of the power supply of the oscillator circuit 170 as a trigger. In FIG. 30, the same processes as the processes illustrated in FIG. 28 described above are denoted by the same step numbers for convenience.

Figure 31A:
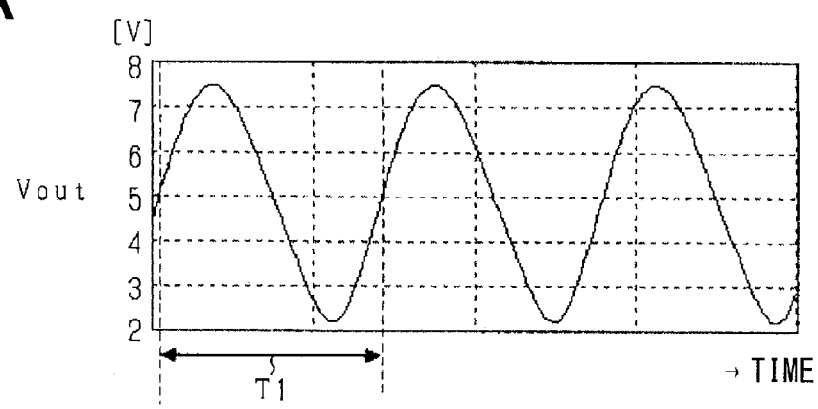
FIG. 31A is a graph illustrating an output voltage of a metal object oscillator circuit when no metal object is present according to the twelfth embodiment.
Figure 31B:
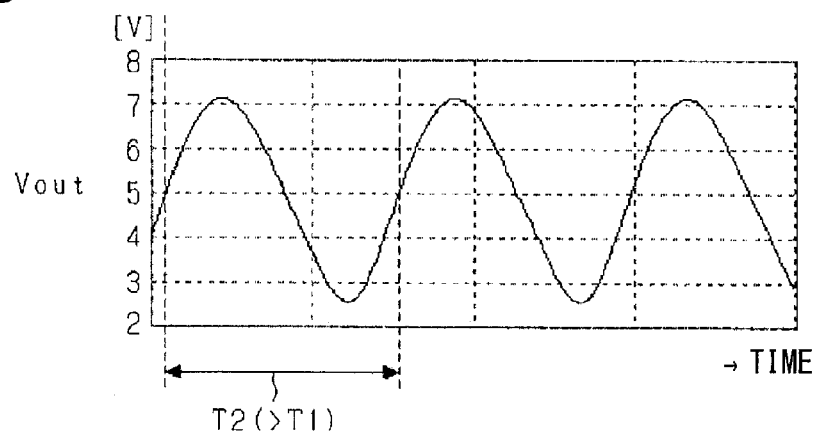
FIG. 31B is a graph illustrating an output voltage of a metal object oscillator circuit when a metal object is present according to the twelfth embodiment.

In the series of processes, after the process in S110 has been completed, the process proceeds to S112$a$, and it is determined whether an absolute value of a difference between the frequency fr and the oscillation frequency fd of the output voltage Vout of the oscillator circuit 170 exceeds a specified value Δ, or not. This process is intended to determine whether the metal object is present on the power transmitting pad 20, or not, as with the process in S112 of FIG. 28 described above. That is, when the metal object is present on the power transmitting pad 20, and the metal object comes close to the detection coils Lij, a resistance of the detection coils Lij increases, and an inductance of the detection coils Lij increases or decrease. As a result, a real oscillation frequency of the oscillator circuit 170 deviates from the original oscillation frequency fd. FIGS. 31A and 31B illustrate a state in which the oscillation frequency is lowered with an increase in the inductance. The frequency fr of the output voltage Vout may be detected by, for example, a frequency counter.

If an affirmative determination is made in S112$a$, it is determined that the metal object is present on the power transmitting pad 20, and the process proceeds to S114.

When the negative determination is made in the above S112$a$, or when the process in S114 is completed, the series of processes is terminated once.

Likewise, in the present embodiment described above, the same advantages as those obtained in the above eleventh embodiment can be obtained.

Thirteenth Embodiment

Hereinafter, a description will be given of a thirteenth embodiment, mainly differences from the eleventh embodiment described above with reference to the drawings. In the present embodiment, a configuration of a metal object detection device is changed.

FIG. 32 is a circuit diagram of the metal object detection device according to the present embodiment. In FIG. 32, the same members as the members illustrated in FIG. 25 described above are denoted by the same symbols for convenience.

As shown in the figure, the output voltage Vout of the oscillator circuit 170 is input to a filter circuit 184. In the present embodiment, the filter circuit 184 is formed of a high-pass filter including a resistor and a capacitor. An output signal of the filter circuit 184 is captured into the detector circuit 180.

Figure 33:
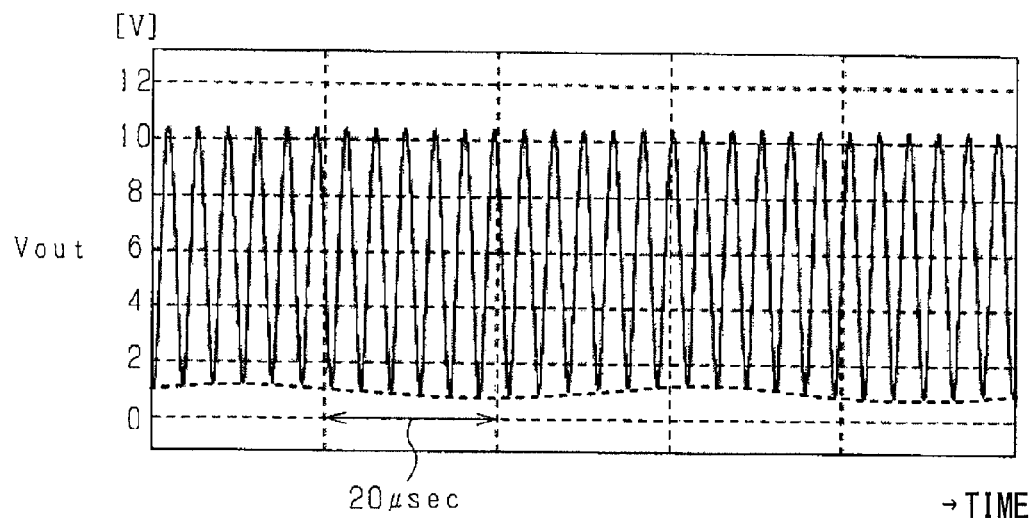
FIG. 33 is a graph illustrating the transition of an output voltage of an oscillator circuit according to the thirteenth embodiment.

Subsequently, a technical significance for the provision of the filter circuit 184 will be described with reference to FIG. 33.

As shown in the figure, a use frequency component of the non-contact power feeding may be superimposed on the output voltage Vout of the oscillator circuit 170 as indicated by dashed lines. In this case, since a waveform of the output voltage Vout is distorted, there is a concern about a reduction in the detection precision of the metal object. In order to avoid the above problem, the filter circuit 184 is provided.

According to the present embodiment described above, an influence of the use frequency can be removed from the output voltage Vout.

Fourteenth Embodiment

Hereinafter, a description will be given of a fourteenth embodiment, mainly differences from the eleventh embodiment described above with reference to the drawings.

Figure 34:
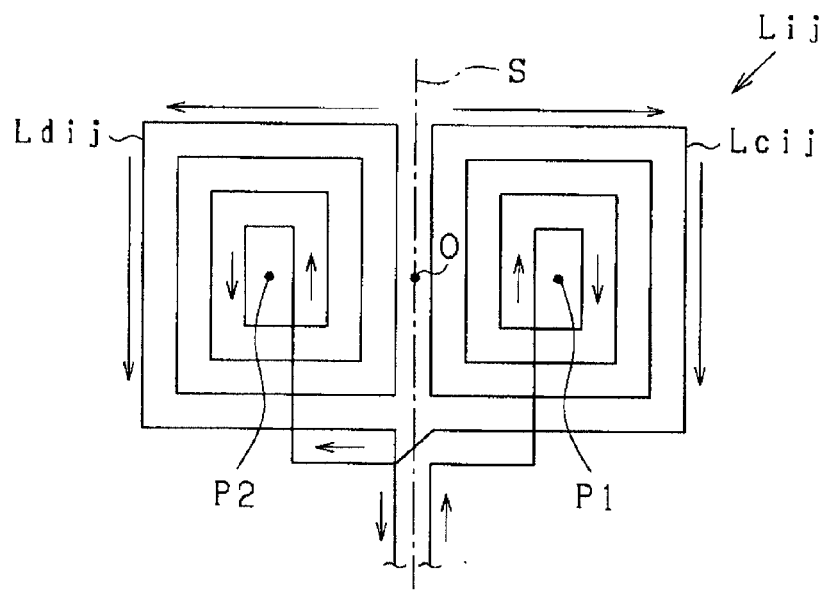
FIG. 34 is a diagram illustrating the shape of detection coils according to a fourteenth embodiment.

In the present embodiment, the shape of the detection coils Lij is changed. In detail, as illustrated in FIG. 34, a first winding part Lcij and a second winding part Ldij configuring the detection coils Lij are formed in a spiral shape when the first winding part Lcij and the second winding part Ldij are viewed from a direction of the first axis P1 and a direction of the second axis P2. This shape is intended to suppress a variation in the detection precision of the metal object on the power transmitting pad 20.

In other words, an electromagnetic field generated by a current flowing into a conductor wire is weakened with distance from the conductor wire configuring the detection coils Lij. Thus, even if the metal object is present within a region partitioned by a contour of each detection coil Lij in a front view of the plate surface of the power transmitting pad 20, a variation in the impedance of the detection coils Lij may be different depending on a position of the metal object in the above region. This leads to a concern that a variation occurs in the detection precision of the metal object based on the output voltage Vout. In order to avoid the above problem, the first winding part Lcij and the second winding part Ldij are formed in a spiral shape, and the electromagnetic field in the region partitioned by the contour of the detection coil Lij in the front view of the plate surface of the power transmitting pad 20 is equalized as much as possible. As a result, a variation in the amount of change of the impedance of the detection coils Lij when the metal object comes close to the detection coils Lij can be suppressed, and further a variation in the detection precision of the metal object can be suppressed.

Figure 35:
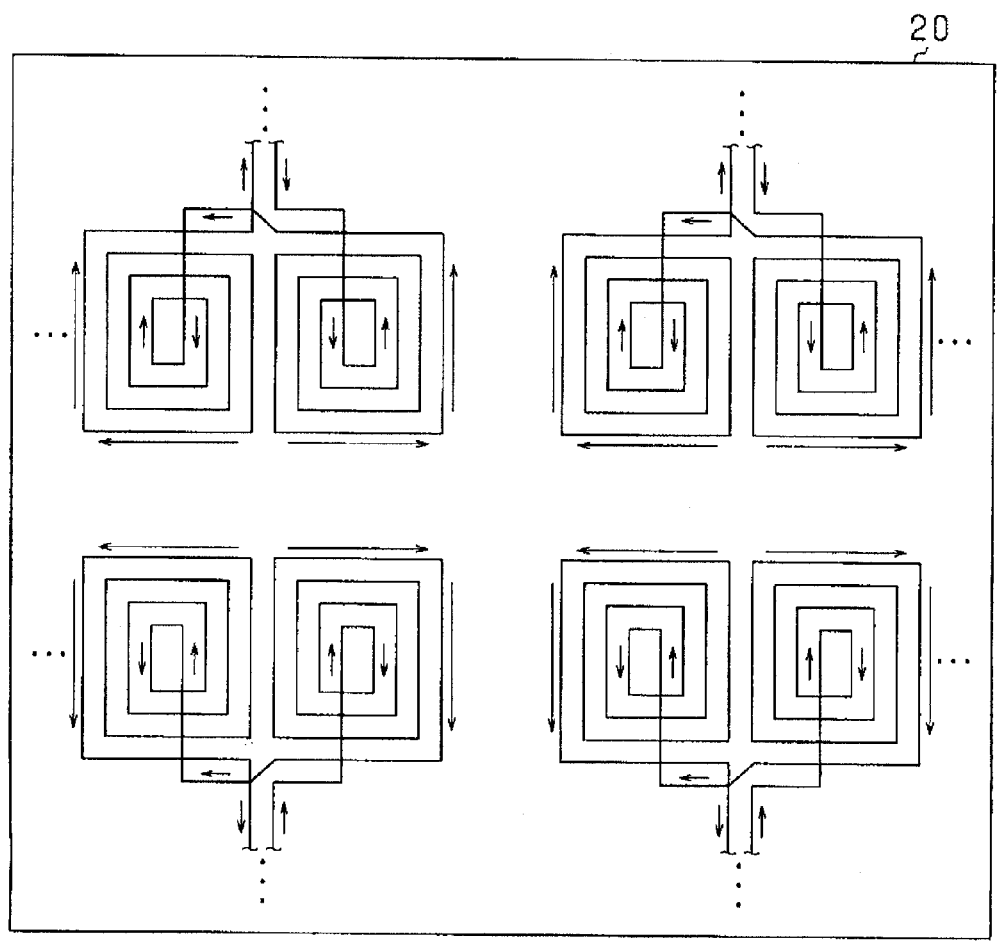
FIG. 35 is a diagram illustrating the arrangement of detection coils in a power transmitting pad according to the fourteenth embodiment.

Further, in the present embodiment, as illustrated in FIG. 34, the respective contours of the first winding part Lcij and the second winding part Ldij are formed in a rectangular shape symmetrical with respect to a plane S passing through a center O between the pair of axes P1 and P2, and being in parallel to the pair of axes P1 and P2 when those winding parts Lcij and Ldij are viewed from the direction of the first axis P1 and the direction of the second axis P2. With the above configuration, as illustrated in FIG. 35, when the detection coils Lij are arrayed within the power transmitting pad 20, gaps between the adjacent detection coils can be reduced. Even with the above configuration, a variation in the detection precision of the metal object on the power transmitting pad 20 can be suppressed. FIG. 35 corresponds to FIG. 27 described above.

The above eleventh to fourteenth embodiments may be changed and implemented as follows.

Figure 36:
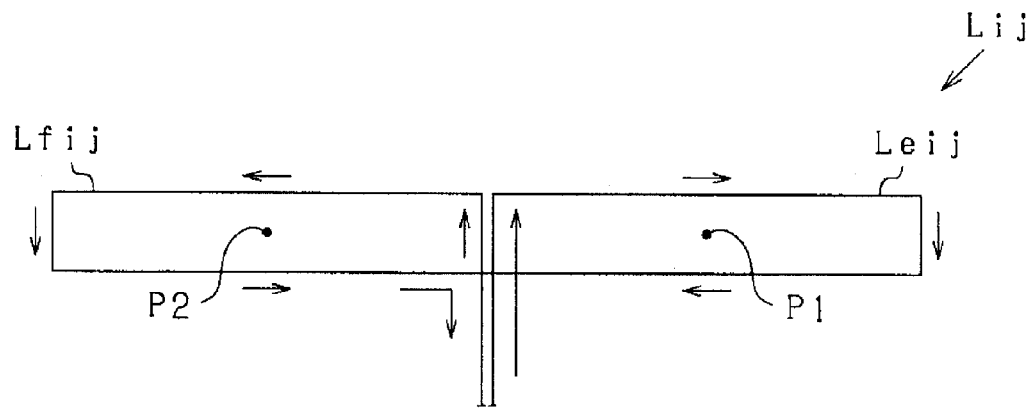
FIG. 36 is a diagram illustrating the shape of detection coils according to another embodiment.
Figure 37:
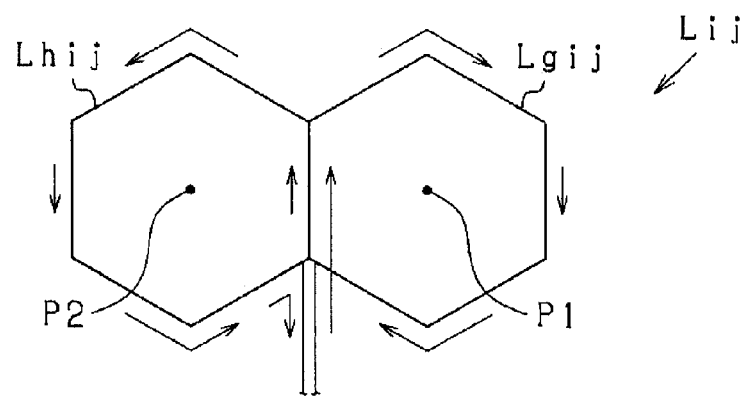
FIG. 37 is a diagram illustrating the shape of detection coils according to another embodiment.
Figure 38:
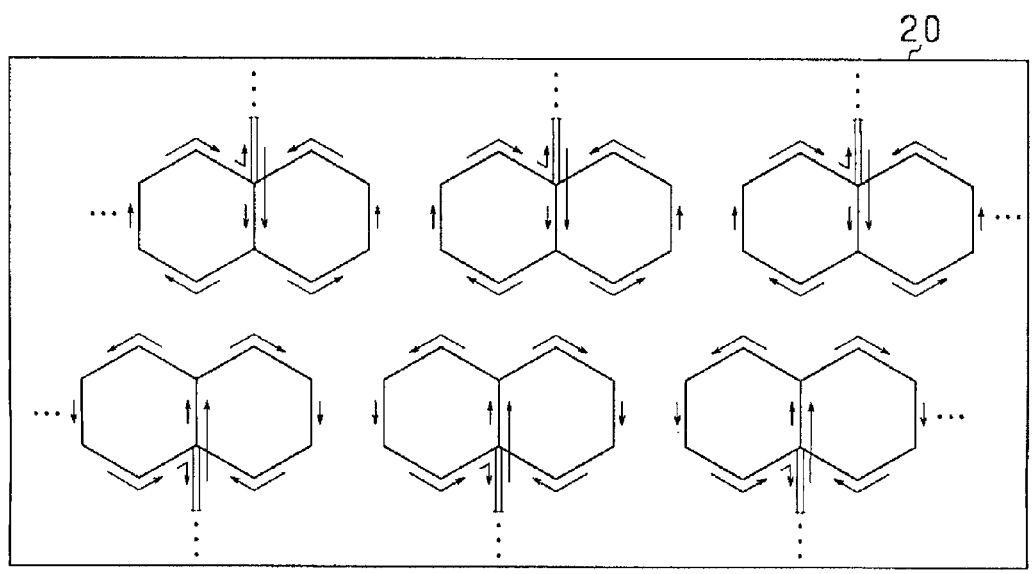
FIG. 38 is a diagram illustrating the arrangement of the detection coils illustrated in FIG. 37 in a power transmitting pad.

The shape of "the detection coils" is not limited to the shape exemplified in the above eleventh embodiment. For example, as illustrated in FIG. 36, the respective contours of a first winding part Leij and a second winding part Lfij may be formed into a rectangular shape. For example, as illustrated in FIG. 37, the respective contours of a first winding part Lgij and a second winding part Lhij may be formed into a regular hexagon. Even in those cases, since the gaps between the adjacent detection coils can be reduced, a variation in the detection precision of the metal object on the power transmitting pad 20 can be suppressed. FIG. 38 illustrates an example of the arrangement mode of the detection coils illustrated in FIG. 37 described above within the power transmitting pad 20. FIG. 38 corresponds to FIG. 27 described above.

As "the detection coils", the first winding part and the second winding part are not limited to the same shape, but may be different in shape from each other. Likewise, in this case, since the winding directions of the first winding part and the second winding part are opposite to each other, the current flowing through the detection coils can be suppressed by allowing the main magnetic flux circulating between the primary coil 22 and the secondary coil 42 to pass through the detection coils.

"The detection coils" are not limited to the configuration in which the winding start and the winding end are located on both ends of the series connection body of the first winding part and the second winding part. For example, the winding part may be further connected in series with at least one of both ends of the series connection body. Even in this case, since a portion of the series connection body is present, the effects of suppressing the current flowing into the detection coils can be obtained by allowing the main magnetic flux to pass through the detection coils.

"The detection coils" are not limited to a configuration in which the first winding part and the second winding part are formed on the single plane that is in parallel to the planes of the spacing parts 21a and 41a. For example, those winding parts may be formed on the single plane that is not in parallel to the planes of the spacing parts 21a and 41a. Even in this case, the current flowing through the detection coils can be suppressed by allowing the main magnetic flux to pass through the detection coils.

Figure 39:
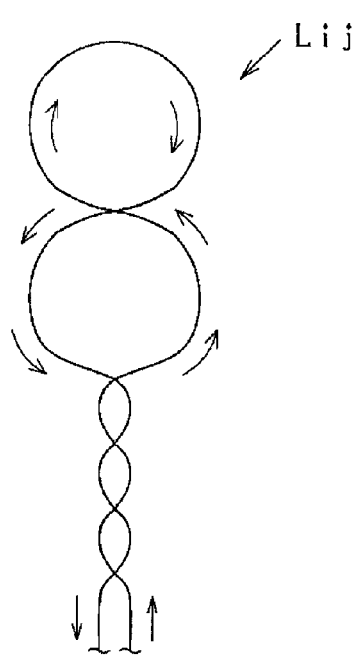
FIG. 39 is a diagram illustrating the shape of detection coils according to another embodiment.

"The detection coils" are not limited to the configuration in which the series connection body of the first winding part and the second winding part is provided, but may be, for example, 8-shaped coils illustrated in FIG. 39. Likely, in this case, the detection coils Lij each include the portion in which the induced current flows in the predetermined direction, and the portion in which the induced current flows in the direction opposite to the predetermined direction when the main magnetic flux passes through the detection coils. As a result, the current can be restrained from flowing into the detection coils Lij by the main magnetic flux.

"The detection coils" are not limited to the planar coils. For example, as illustrated in FIGS. 40A to 40J, the detection coils may be patterned on a multilayer substrate. FIGS. 40A to 40J exemplify the detection coils patterned on first to fourth substrates CB1 to CB4. Insulating layers between the respective substrates are omitted from illustration.

Each of the first to fourth substrates CB1 to CB4 forms a rectangular shape in a front view of a plate surface thereof. In detail, a first coil part W1 connected to a first terminal T1 is patterned on the first substrate CB1 illustrated in FIGS. 40A and 40B. A first through-hole SH1 connected on the opposite side of the first terminal T1 at both ends of the first coil part W1 is formed. A second coil part W2 having one end connected to the first coil part W1 through the first through-hole SH1 is patterned on the second substrate CB2 illustrated in FIGS. 40C and 40D. A second through-hole SH2 connected to the opposite side of the first through-hole SH1 side at both ends of the second coil part W2 is formed on the second substrate CB2.

Figure 40A:
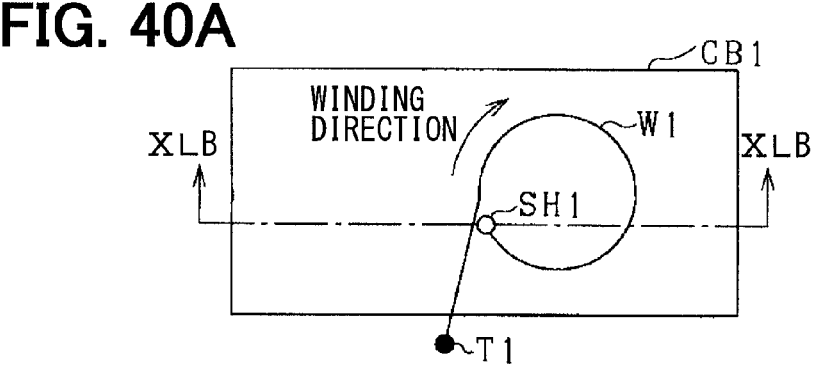
FIG. 40A is a front view of a first substrate on which a first coil position is patterned.
Figure 40B:
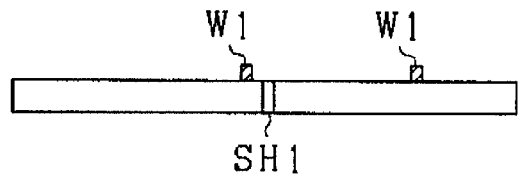
FIG. 40B is a cross-sectional view of the first substrate taken along a line XLB-XLB in FIG. 40A.
Figure 40C:
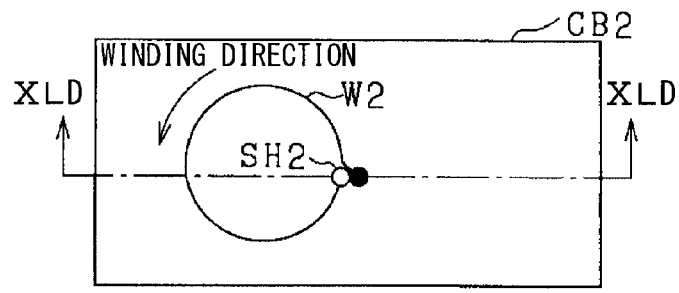
FIG. 40C is a front view of a second substrate on which a second coil position is patterned.
Figure 40D:
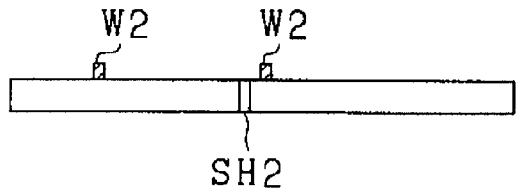
FIG. 40D is a cross-sectional view of the second substrate taken along a line XLD-XLD in FIG. 40C.
Figure 40E:
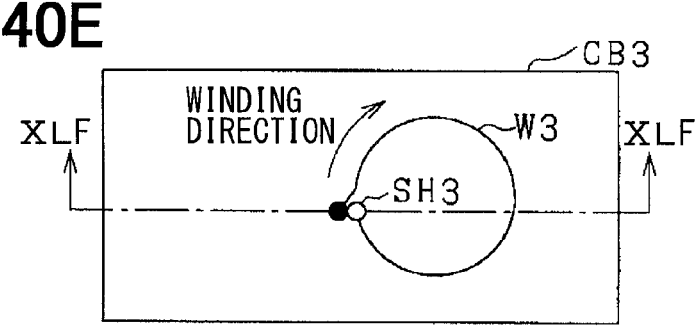
FIG. 40E is a front view of a third substrate on which a third coil position is patterned.
Figure 40F:
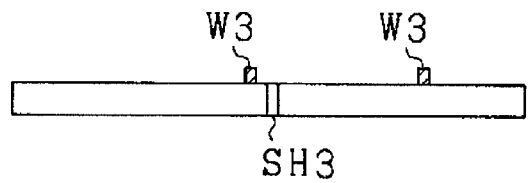
FIG. 40F is a cross-sectional view of the third substrate taken along a line XLF-XLF in FIG. 40E.
Figure 40G:
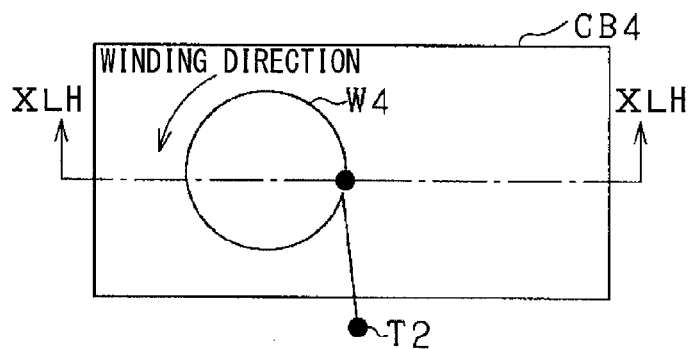
FIG. 40G is a front view of a fourth substrate on which a fourth coil position is patterned.
Figure 40H:
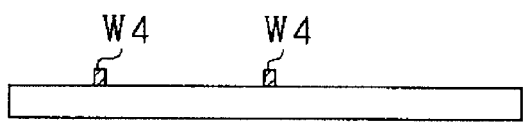
FIG. 40H is a cross-sectional view of the fourth substrate taken along a line XLH-XLH in FIG. 40G.

A third coil part W3 having one end connected to the second coil part W2 through the second through-hole SH2 is patterned on the third substrate CB3 illustrated in FIGS. 40E and 40F. A third through-hole SH3 connected to the opposite side of the second through-hole SH2 side at both ends of the third coil part W3 is formed on the third substrate CB3. A fourth coil part W4 having one end connected to the third coil part W3 through the third through-hole SH3 is patterned on the fourth substrate CB4 illustrated in FIGS. 40G and 40H. A second terminal T2 is connected to the opposite side of the third through-hole SH3 side at both ends of the fourth coil part W4.

Figure 40I:
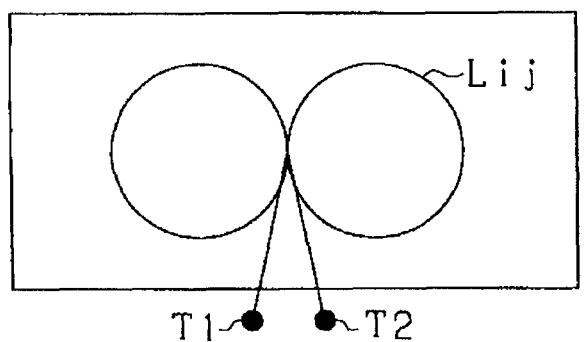
FIG. 40I is a diagram of any one plate surface of the first to fourth substrates on which patterns formed on the other three substrates are projected.
Figure 40J:
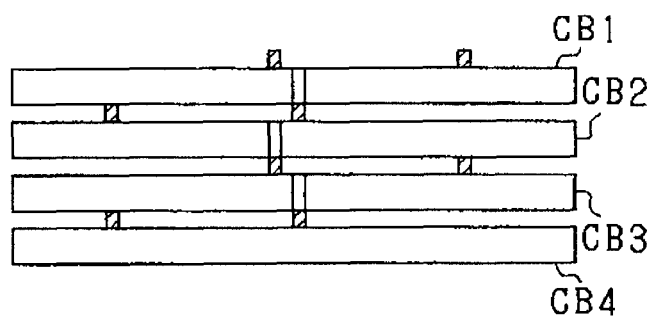
FIG. 40J is a cross-sectional view illustrating a state in which the first to fourth substrates are laminated.

The first substrate CB1, the second substrate CB2, the third substrate CB3, and the fourth substrate CB4 are laminated as illustrated in FIG. 40J. According to the above configuration, as illustrated in FIG. 40I, the detection coil Lij having the winding start on one of the first terminal T1 and the second terminal T2, and the winding end on the other terminal is formed. The detection coil Lij of this type obtains an advantage to easily manufacture the detection coils in mass production.

"The detection coils" may be patterned on a double-sided substrate as illustrated in FIGS. 41A to 41C, and 42A to 42C. FIGS. 41A to 41C, and 42A to 42C exemplify 8-shaped detection coils patterned on a double-sided substrate CB having a first surface Sa, and a second surface Sb which is a rear surface of the first surface Sa.

Figure 41A:
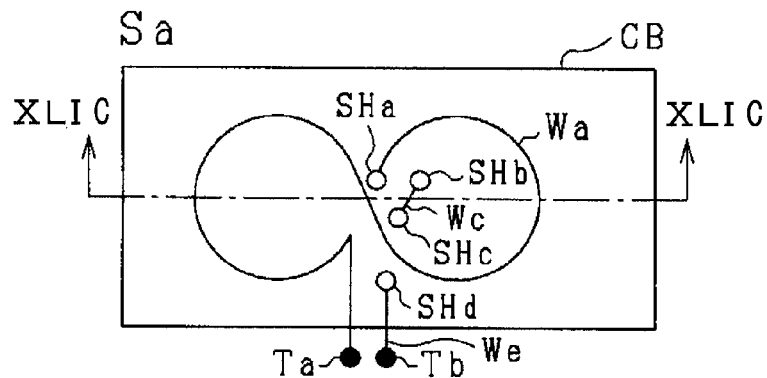
FIG. 41A is a diagram illustrating a detection coil formed on a first surface of a double-sided substrate.
Figure 41B:
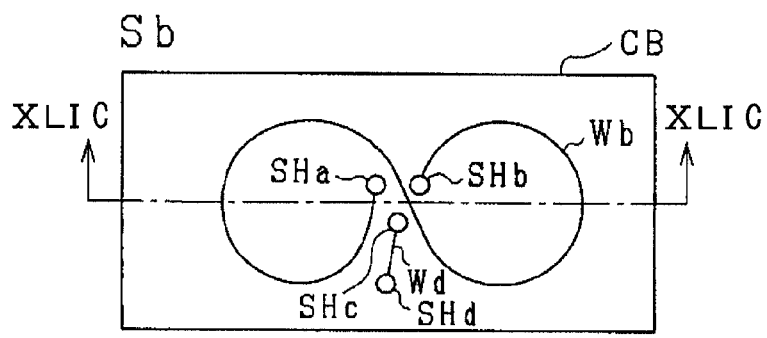
FIG. 41B is a diagram illustrating a detection coil formed on a second surface of the double-sided substrate.
Figure 41C:
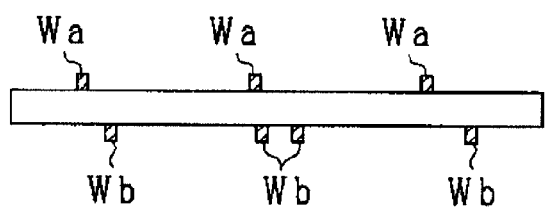
FIG. 41C is a cross-sectional view of the double-sided substrate taken along a line XLIC-XLIC of FIGS. 41A and 41B.

First, an example illustrated in FIGS. 41A to 41C will be described. An 8-shaped first coil part Wa connected to a first terminal Ta is patterned on the first surface Sa. An opposite side of the first terminal Ta at both ends of the first coil part Wa is connected to one end of an 8-shaped second coil part Wb patterned on the second surface Sb through a first through-hole SHa.

An opposite side of the first through-hole SHa side at both ends of the second coil part Wb is connected to one end of a third coil part Wc patterned on the first surface Sa through a second through-hole SHb. The third coil part Wc is patterned on the first surface Sa over the second coil part Wb. An opposite side of the second through-hole SHb side at both ends of the third coil part Wc is connected to one end of a fourth coil part Wd patterned on the second surface Sb through a third through-hole SHc.

The fourth coil part Wd is patterned on the second surface Sb over the first coil part Wa. An opposite side of the third through-hole SHc at both ends of the fourth coil part Wd is connected to one end of a fifth coil part We patterned on the first surface Sa through a fourth through-hole SHd. A second terminal Tb is connected to the opposite side of the fourth through-hole SHd at both ends of the fifth coil part We.

Figure 42A:
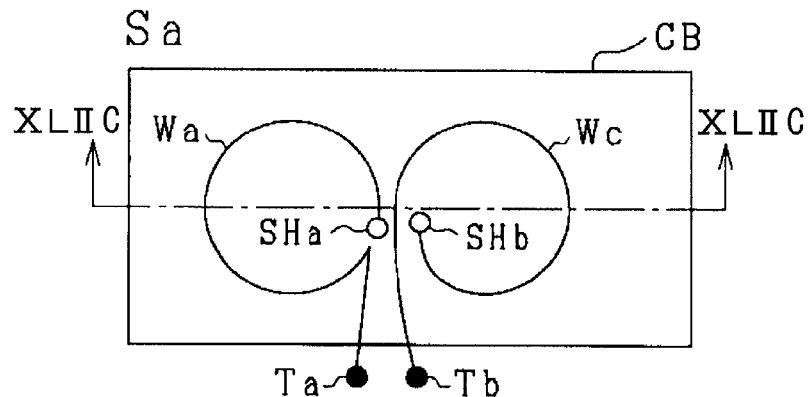
FIG. 42A is a diagram illustrating detection coils formed on a first surface of a double-sided substrate.
Figure 42B:
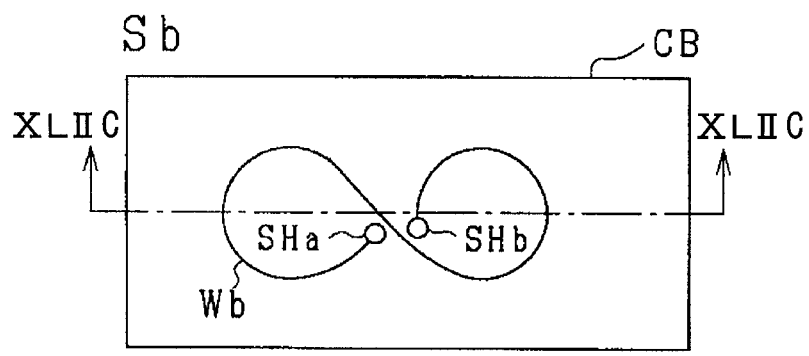
FIG. 42B is a diagram illustrating a detection coil formed on a second surface of the double-sided substrate.
Figure 42C:
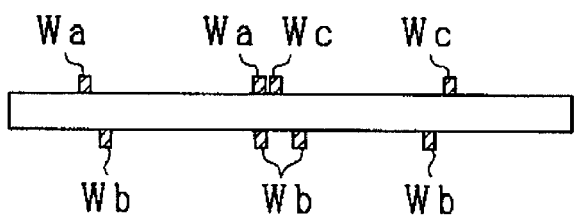
FIG. 42C is a cross-sectional view of the double-sided substrate taken along a line XLIIC-XLIIC of FIGS. 42A and 42B.

Subsequently, an example illustrated in FIGS. 42A to 42C will be described. The first coil part Wa connected to the first terminal Ta is patterned on the first surface Sa. An opposite side of the first terminal Ta at both ends of the first coil part Wa is connected to one end of an 8-shaped second coil part Wb patterned on the second surface Sb through a first through-hole SHa.

An opposite side of the first through-hole SHa side at both ends of the second coil part Wb is connected to one end of a third coil part We patterned on the first surface Sa through a second through-hole SHb. A second terminal Tb is connected to the opposite side of the second through-hole SHb side at both ends of the third coil part Wc.

Likewise, with the configuration described above, the detection coil having the winding start on one of the first terminal Ta and the second terminal Tb, and the winding end on the other terminal can be formed.

The arrangement technique of "the detection coils" is not limited to the techniques exemplified in the respective embodiments. For example, if the power transmitting pad 20 is installed in a power equipment arranged above the vehicle 10, because it is conceivable that the power receiving pad 40 is disposed on an upper part of the vehicle, the detection coils may be arranged on the power receiving pad 40. Even in this case, the metal object present in the path of the magnetic flux generated by the primary coil 22 and the secondary coil 42 can be intended to be detected by the detection coils. For example, in the power equipment in which the power transmitting pad 20 is arranged behind the vehicle 10, because it is conceivable that the power receiving pad 40 is disposed at the rear of the vehicle 10, the detection coil may be arranged on at least one of the power transmitting pad 20 and the power receiving pad 40. Even in this case, since there is a risk that the metal object adheres to the power transmitting pad 20 or the power receiving pad 40, the application of the present disclosure is effective.

The number of arrangement of "detection coils" is not limited to plurality, but may be one if the detection coils have a size that can cover an area in which the metal object is heated by the non-contact power feeding, and allows the impedance change of the detection coil caused by the metal object to satisfy the detection precision of the metal object.

The "connection part" is not limited to the configuration exemplified in the above eleventh embodiment. For example, two or more detection coils which are a part of the plural detection coils Lij may be sequentially selected as the components of the oscillator circuit 170. Likewise, in this case, the numbers of oscillator circuits 170 and detector circuits 180 can be reduced. In the above configuration, since the oscillation conditions of the oscillator circuit 170 change according to the number of selection of the detection coils, the capacitance of the capacitor configuring the oscillator circuit 170 may be changeable according to the number of selection of the detection coils.

The oscillator circuit as "the supply part" is not limited to the configuration exemplified in the above eleventh embodiment. For example, the oscillator circuit may be a Hartley oscillator circuit. In this case, for example, one of a pair of coils configuring the Hartley oscillator circuit may function as the detection coil.

The "supply unit" is not limited to the oscillator circuit, but may be, for example, a power supply that outputs an AC current having a predetermined amplitude. In this case, when it is determined that a real phase difference deviates from a reference phase difference of a potential difference (hereinafter referred to as "inter-terminal voltage") between both ends of the detection coil to the AC current output from the power supply, it may be determined that the metal object is present on the power transmitting pad 20. This technique uses a phenomenon that a phase of the inter-terminal voltage to the AC current output from the power supply changes due to a reduction in the impedance of the detection coil caused by the approximation of the metal object.

The process of FIG. 28 in the above eleventh embodiment, and the process in FIG. 30 in the above twelfth embodiment can be also used as an initial operation check routine for determining whether the metal object detection device normally operates, or not. That is, in the situation in which the affirmative determination is made in S112 of FIG. 28 or S112a of FIG. 30, a metal foreign matter is present on the power transmitting pad 20, and also the detection coils and the circuits configuring the metal object detection device may be abnormal.

The oscillation frequency fd of the oscillator circuit 170 may be set to be lower than the use frequency fe of the non-contact power feeding.

"The primary coil" and "the secondary coil" are not limited to the configurations exemplified in the above eleventh embodiment, but may be, for example, spiral circular planar coils.

In the above eleventh embodiment, the oscillator circuit 170, the detector circuit 180, and the output circuit 182 may be embedded in the power transmitting pad 20.

"The filter unit" is not limited to the high-pass filter, but may be a band-pass filter. "The filter unit" is not limited to the analog filter, but may be a digital filter.

In S112 of FIG. 28 in the above eleventh embodiment, any one of the conditions for the latest maximum value Vmax of the output voltage Vout, or the conditions for the latest minimum value Vmin of the output voltage Vout may be removed.

In S114 of FIG. 28 in the above eleventh embodiment, the stop of the power supply is instructed, but a decrease in the power supply may be instructed without being limited to this configuration.

The vehicle to which the present disclosure is applied is not limited to an electric vehicle, but may be, for example, an automatic transport vehicle in a factory.

The invention claimed is:

1. A metal object detection device applied to a non-contact power feeding device that performs power transfer between a primary coil and a secondary coil in a non-contact manner, the metal object detection device comprising:
    a plurality of detection coils detecting a metal object present in a path of a magnetic flux generated by at least one of the primary coil and the secondary coil;

a capacitor configuring a resonant circuit in cooperation with each of at least two of the plurality of detection coils;

a first series connection body including one of a series connection body having at least one of the resonant circuits and a first passive element, the at least one of the resonant circuits and the first passive element being connected in series, and a series connection body having the detection coil and the capacitor configuring one of the resonant circuits, the detection coil and the capacitor being connected in series;

a second series connection body including one of a series connection body having at least one of the resonant circuits except for the resonant circuit configuring the first series connection body and a second passive element, the at least one of the resonant circuits except for the resonant circuit configuring the first series connection body and the second passive element being connected in series, and a series connection body having the detection coil and the capacitor configuring one of the resonant circuits except for the resonant circuit configuring the first series connection body, the detection coil and the capacitor configuring one of the resonant circuits except for the resonant circuit configuring the first series connection body being connected in series;

a voltage applying unit applying an AC voltage to both ends of each of the first series connection body and the second series connection body; and a processing unit performing a process for detecting the metal object on the basis of a potential difference between a connection point included in the first series connection body and a connection point included in the second series connection body.

2. The metal object detection device according to claim 1, wherein
the first series connection body and the second series connection body are connected in parallel to each other.

3. The metal object detection device according to claim 2, wherein
at least four of the detection coils are provided,
each of the at least four detection coils includes the capacitor and the resonant circuit,
the first series connection body includes a series connection body having a first resonant circuit which is one of the at least four resonant circuits, and a second resonant circuit which is one of the remaining resonant circuits, and which is the first passive element,
the second series connection body includes a series connection body having a third resonant circuit which is one of the at least four resonant circuits except for the first resonant circuit and the second resonant circuit, and a fourth resonant circuit which is one of the at least four resonant circuits except for the first resonant circuit, the second resonant circuit, and the third resonant circuit, and which is the second passive element, and
the processing unit performs the detecting process on the basis of a potential difference between a connection point of the first resonant circuit and the second resonant circuit, and a connection point of the third resonant circuit and the fourth resonant circuit.

4. The metal object detection device according to claim 3, wherein
the first resonant circuit, the second resonant circuit, the third resonant circuit, and the fourth resonant circuit are identical with each other in impedance at a frequency of an output voltage of the voltage applying unit.

5. The metal object detection device according to claim 2, wherein
the resonant circuit configuring the first series connection body, the resonant circuit configuring the second series connection body, the first passive element, and the second passive element configure an AC bridge.

6. The metal object detection device according to claim 2, wherein
the detection coil includes a portion in which an induced current flows in a predetermined direction, and a portion in which the induced current flows in a direction opposite to the predetermined direction when a main magnetic flux circulating between the primary coil and the secondary coil passes through the detection coil.

7. The metal object detection device according to claim 1, further comprising:
an input side resonant circuit having a coil and a capacitor; and
a load side resonant circuit having a coil and a capacitor, wherein
each of the detection coils configures a resonant circuit in cooperation with the capacitor,
the first series connection body includes a series connection body having the detection coil and the capacitor configuring one of the resonant circuits having the detection coil,
the second series connection body includes a series connection body having the detection coil and the capacitor configuring one of the resonant circuits except for the resonant circuit configuring the first series connection body,
the voltage applying unit applies an AC voltage between both ends of each of the first series connection body and the second series connection body with the application of the AC voltage to the input side resonant circuit,
the detection coils and the capacitors configuring the plurality of resonant circuits configure relay coils and relay capacitors which perform power transfer between the input side resonant circuit and the load side resonant circuit in a non-contact manner with the application of the AC voltage by the voltage applying unit,
a first connection point which is a connection point between the detection coil and the capacitor configuring the first series connection body has the same potential as a second connection point which is a connection point between the detection coil and the capacitor configuring the second series connection body, and
the processing unit performs a process for detecting the metal object on the basis of a potential difference between a portion without having the same potential in a closed circuit including the first series connection body and a portion without having the same potential in a closed circuit including the second series connection body.

8. The metal object detection device according to claim 7, wherein
the first connection point and the second connection point are grounded to provide the first connection point and the second connection point with the same potential.

9. The metal object detection device according to claim 7, wherein the first connection point and the second connection point are short-circuited to each other to provide the first connection point and the second connection point with the same potential.

10. The metal object detection device according to claim 7, wherein
a detection coil of the detection coils except for the detection coils configuring the first series connection body and the second series connection body is arranged outside a path of the main magnetic flux circulating between the primary coil and the secondary coil.

11. The metal object detection device according to claim 1, wherein
a frequency of an output voltage of the voltage applying unit is set to the same frequency as a resonant frequency of the resonant circuit.

12. The metal object detection device according to claim 7, wherein
a system including the plurality of resonant circuits, the input side resonant circuit, and the load side resonant circuit has a plurality of resonant frequencies, and
the processing unit performs the process for detecting the metal object on the basis of the respective potential differences when the frequency of the AC voltage to be applied to the input side resonant circuit by the voltage applying unit is set to the respective resonant frequencies.

13. The metal object detection device according to claim 7, wherein
at least one of the resonant circuits and the load side resonant circuit has a switch that is turned on or off to switch the resonant circuit to an open state or a closed state, and
the processing unit performs the process for detecting the metal object on the basis of the respective potential differences when an operation state of the switch is changed to each of a plurality of kinds of states.

14. The metal object detection device according to claim 1, wherein
the resonant frequency of the resonant circuit is set to a frequency different from the frequency of the voltage to be applied to the primary coil when the power transfer is performed in the non-contact manner.

15. The metal object detection device according to claim 1, further comprising:
a filter unit that removes an influence of the frequency of the voltage to be applied to the primary coil from the potential difference when the power transfer is performed in the non-contact manner, wherein
the resonant circuit includes a serial resonant circuit, and
the processing unit performs the detecting process on the basis of the potential difference from which the influence is removed by the filter unit.

16. The metal object detection device according to claim 1, wherein
the non-contact power feeding device further includes:
a primary core on which the primary coil is wound, and
a secondary core on which the secondary coil is wound, each of the primary core and the secondary core includes:
a pair of spacing parts having planes parallel to each other, and spaced from each other, and
a coupling part that couples the spacing parts with each other, and
the non-contact power feeding device is configured so that the plane of the spacing part provided in the primary core becomes in parallel to the plane of the spacing part provided in the secondary core when the power transfer is performed in the non-contact manner.

17. A metal object detection device applied to a non-contact power feeding device that performs power transfer between a primary coil and a secondary coil in a non-contact manner, the metal object detection device comprising:
a detection coil detecting a metal object present in a path of a magnetic flux generated by at least one of the primary coil and the secondary coil when the power transfer is performed in the non-contact manner;
a supply unit supplying an AC power to the detection coil; and
a processing unit performing a process for detecting the metal object on the basis of a change in impedance of the detection coil when the AC power is supplied to the supply unit, wherein:
the detection coil concurrently includes a portion in which an induced current flows in a predetermined direction, and a portion in which the induced current flows in a direction opposite to the predetermined direction when a main magnetic flux circulating between the primary coil and the secondary coil passes through the detection coil; and
the detection coil includes a series connection body having a first winding part wound around one of a pair of axes that is in parallel to and spaced from each other in a specified direction, and a second winding part wound around the other of the pair of axes in a direction opposite to the specified direction, as the portion in which the induced current flows in the predetermined direction, and the portion in which the induced current flows in the direction opposite to the predetermined direction.

18. The metal object detection device according to claim 17, wherein
the non-contact power feeding device is configured so that the primary coil and the secondary coil face each other when the power transfer is performed in the non-contact manner, and
the portion in which the induced current flows in the predetermined direction, and the portion in which the induced current flows in the direction opposite to the predetermined direction are formed on a single plane orthogonal to a direction along which the primary coil and the secondary coil face each other.

19. The metal object detection device according to claim 17, wherein
the portion in which the induced current flows in the predetermined direction, and the portion in which the induced current flows in the direction opposite to the predetermined direction are patterned on one of a multilayer substrate and a double-sided board.

20. The metal object detection device according to claim 17, wherein
a plurality of the detection coils are provided, and
the metal object detection device further comprises a connection part selectively connecting the supply unit to at least one of the detection coils.

21. The metal object detection device according to claim 17, wherein
each of the first winding part and the second winding part is formed in a spiral shape when viewed from the pair of axial directions.

22. The metal object detection device according to claim 21, wherein
each contour of the first winding part and the second winding part is formed in a polygonal shape symmetrical with respect to a plane that passes through a center of the pair of axes, and is in parallel to the axes when the winding parts are viewed from the pair of axial directions.

23. The metal object detection device according to claim 17, wherein
the detection coil is arranged so that a main magnetic flux that passes through the first winding part and a main magnetic flux that passes through the second winding part become equal to each other when the power transfer is performed in the non-contact manner.

24. The metal object detection device according to claim 17, wherein
the supply unit includes an oscillator circuit having the detection coil as a component,
the metal object detection device further comprises a detection unit detecting an output voltage of the oscillator circuit, and
the processing unit performs the detecting process on the basis of an amplitude of the output voltage detected by the detection unit.

25. The metal object detection device according to claim 17, wherein
the supply unit includes an oscillator circuit having the detection coil as a component,
the metal object detection device further comprises a detection unit that detects an output voltage of the oscillator circuit, and
the processing unit performs the detecting process on the basis of a frequency of the output voltage detected by the detection unit.

26. The metal object detection device according to claim 24, further comprising:
a filter unit that removes an influence of the frequency of the voltage to be applied to the primary coil from a detection value of the detection unit when the power transfer is performed in the non-contact manner, wherein
the processing unit performs the detecting process on the basis of the detection value of the detection unit from which the influence is removed by the filter unit.

27. The metal object detection device according to claim 17, wherein
the non-contact power feeding device further includes:
a primary core on which the primary coil is wound, and
a secondary core on which the secondary coil is wound,
each of the primary core and the secondary core includes:
a pair of spacing parts having planes parallel to each other, and spaced from each other, and
a coupling part that couples the spacing parts with each other,
the non-contact power feeding device is configured so that the plane of the spacing part provided in the primary core becomes in parallel to the plane of the spacing part provided in the secondary core when the power transfer is performed in the non-contact manner, and
the portion in which the induced current flows in the predetermined direction, and the portion in which the induced current flows in the direction opposite to the predetermined direction are formed on a single plane that is in parallel to the planes of the spacing parts.

28. The metal object detection device according to claim 1, wherein:
the connection point included in the first series connection body corresponds to a boundary between the at least one of the resonant circuits and the first passive element, or a boundary between the detection coil and the capacitor configuring the one of the resonant circuits;
the connection point included in the second series connection body corresponds to a boundary between the at least one of the resonant circuits except for the resonant circuit configuring the first series connection body and the second passive element, or a boundary between the detection coil and the capacitor configuring the one of the resonant circuits except for the resonant circuit configuring the first series connection body; and
the resonant circuit configuring the first series connection body, the resonant circuit configuring the second series connection body, the first passive element, and the second passive element configure an AC bridge.

* * * * *